US012614063B2

(12) United States Patent
Ahmadi et al.

(10) Patent No.: US 12,614,063 B2
(45) Date of Patent: Apr. 28, 2026

(54) IMPLEMENTATION OF ARGMAX OR ARGMIN IN HARDWARE

(71) Applicant: Imagination Technologies Limited, Kings Langley (GB)

(72) Inventors: Aria Ahmadi, Hertfordshire (GB); Muhammad Asad, Hertfordshire (GB); Cagatay Dikici, Hertfordshire (GB); Elia Condorelli, Milan (IT)

(73) Assignee: Imagination Technologies Limited, Kings Langley (GB)

( * ) Notice: Subject to any disclaimer, the term of this patent is extended or adjusted under 35 U.S.C. 154(b) by 939 days.

(21) Appl. No.: 17/850,319

(22) Filed: Jun. 27, 2022

(65) Prior Publication Data

US 2023/0012553 A1     Jan. 19, 2023

(30) Foreign Application Priority Data

Jun. 28, 2021     (GB) ...................................... 2109296

(51) Int. Cl.
| | |
|---|---|
| *G06N 3/06* | (2006.01) |
| *G06N 3/048* | (2023.01) |
| *G06N 3/063* | (2023.01) |

(52) U.S. Cl.
CPC ............. *G06N 3/063* (2013.01); *G06N 3/048* (2023.01)

(58) Field of Classification Search
CPC ................................ G06N 3/063; G06N 3/048
See application file for complete search history.

(56) References Cited

U.S. PATENT DOCUMENTS

| | | | |
|---|---|---|---|
| 10,062,039 B1 * | 8/2018 | Lockett .................. | G06N 3/044 |
| 10,997,116 B2 | 5/2021 | Reinhardt et al. | |
| 11,358,003 B2 * | 6/2022 | Sjölund ................ | A61N 5/1081 |
| 2018/0020243 A1 * | 1/2018 | Ni ....................... | H04N 21/8549 |
| 2018/0365532 A1 * | 12/2018 | Molchanov .......... | G06V 40/162 |
| 2020/0110579 A1 | 4/2020 | Zhang et al. | |
| 2021/0073953 A1 * | 3/2021 | Lee ........................ | G06N 3/084 |
| 2021/0240895 A1 * | 8/2021 | Pop ........................ | G06F 7/544 |
| 2022/0044110 A1 * | 2/2022 | Ryu ........................ | G06N 3/08 |
| 2022/0245434 A1 * | 8/2022 | Perkins .................... | A61F 2/72 |
| 2022/0277549 A1 * | 9/2022 | Ghafoorian ........... | G06V 20/56 |
| 2022/0391172 A1 * | 12/2022 | Imber ................... | G06N 3/063 |
| 2022/0405553 A1 * | 12/2022 | Li ........................ | G06N 3/0464 |

OTHER PUBLICATIONS

2020, Anonymous, "Vocabulary/Idioms—J Wiki;" URL: https://code.jsoftware.com/mediawiki/index.QhQ?title=Vocabulary/Idiom &oldid=29054 Section Array Coordinates ("Index of" for a rank 2+array).

* cited by examiner

*Primary Examiner* — Mohammad S Rostami
(74) *Attorney, Agent, or Firm* — Potomac Law Group, PLLC; Vincent M DeLuca

(57) ABSTRACT

A mechanism for processing, on a hardware accelerator comprising fixed-function circuitry, data according to a neural network process that comprises a neural network with an associated argmax or argmin function. The argmax or argmin function is mapped to a set of elementary neural network operations available to the fixed-function circuitry. The neural network process is then executed using the fixed-function circuitry. The data processed using the neural network process comprises image and/or audio data.

14 Claims, 11 Drawing Sheets

IMPLEMENTATION OF ARGMAX OR ARGMIN IN HARDWARE

BACKGROUND

Pooling, unpooling and reverse pooling operations are widely used in neural network architectures, and including convolutional neural networks. A pooling operation involves selection of a certain value (e.g. a maximum/minimum value) of a particular tensor or sub-tensor as an output. An unpooling or reverse pooling operation maps a value back to its "original" position in a tensor. Of course, an unpooling or reverse pooling operation may also be used to place other values (e.g. gradients) at the position of maximum/minimum values in an original tensor.

Argmax or Argmin are other functions/operations that are used in neural network architectures. Generally, these operations find an index of a maximum/minimum value within a tensor (e.g. a vector or matrix). Thus, where x=[5,6,7,4, 1] then Argmax (x)=2 and Argmin (x)=4; assuming that a zero-index approach is used. In some instances, argmax/argmin can be applied along a particular dimension of a multi-dimensional matrix.

Argmax/Argmin find particular use during a pooling/unpooling procedure. When a Maxpool or Minpool operation takes place, the (relative) location of the pixel that contributes its value to the pooled value is recorded using a corresponding Argmax/Argmin function. Subsequently, during an unpooling procedure, the pooled value can then be correctly routed to its position in the reconstructed tensor based on the recorded location of the pixel (i.e. the result of the Argmax/Argmin function). If multiple pooled values are routed to a same location, then they may be summed together or a single one of the pooled values selected.

Argmax/argmin also finds use in a segmentation procedure. An image may be input to a neural network, which identifies, for each pixel, a set of probabilities, each probability indicating a likelihood that the said pixel lies within a particular class (e.g. "an apple", "a banana" or "background"). The Argmax operation is then used to identify the class (for that pixel) associated with the highest probability. The pixel is then assigned to that class.

It is becoming increasingly common to implement neural networks on specially adapted hardware accelerators, known as neural network accelerators (NNAs), that have fixed-functionality circuits which are able to perform a restricted number of operations using hardware. These devices—usually integrated circuits—are typically specialised at evaluating the most computationally intensive operations encountered when using a neural network for inference. For example, a neural network accelerator may include a plurality of convolution engines, which are specialised at evaluating convolutional layers. Other example elements include an element-wise operations unit, specialised at performing the same operation to every element of a tensor or to pairs of elements of two tensors, an activation unit, specialised at implementing one or more activation functions. Yet other example elements include a local response normalisation (LRN) unit (or normalisation unit, for short), specialised at performing neighbourhood-based normalisation operations, and a pooling unit, specialised at performing pooling operations, such as max pooling and min pooling. A further example element present in some NNAs is a memory manipulation module, specialised at reshaping the manner and order of dimensions of multi-dimensional tensors presented in memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosure presents a mechanism for processing, on a hardware accelerator comprising fixed-function circuitry, data according to a neural network process that comprises a neural network with an associated argmax or argmin function. The argmax or argmin function is mapped to a set of elementary neural network operations available to the fixed-function circuitry. The neural network process is then executed using the fixed-function circuitry. The data processed using the neural network process comprises image and/or audio data.

There is proposed a method of processing data according to a neural network process using a hardware accelerator comprising fixed-function circuitry configured to perform a set of available elementary neural network operations.

The method comprises: receiving a definition of a neural network process to be performed on the data, the neural network process comprising a neural network with an associated argmax or argmin function; mapping the argmax or argmin function to a set of elementary neural network operations, wherein the set of elementary neural network operations comprises only elementary neural network operations from the set of available elementary neural network operations; processing the data according to the neural network process, using the fixed-function circuitry of the hardware accelerator to perform the neural network with the associated argmax or argmin function, wherein the argmax or argmin function is performed using the set of elementary neural network operations, wherein the data comprises image data and/or audio data; wherein each of the set of elementary neural network operations is selected from a list consisting of: an element-wise subtraction operation; an element-wise addition operation; an element-wise multiplication operation; an element-wise maximum operation; an element-wise minimum operation; a max pooling operation or min pooling operation; a magnitude operation; and one or more lookups operations using one or more look-up tables.

The data which is processed according to the neural network process may be a tensor (e.g. a vector or matrix)—i.e. an "input tensor". The input tensor may have dimensions of height, width, channel, batch and/or length (depending upon the precise implementation of the tensor).

The argmax/argmin function may be implemented solely using the set of elementary neural network operations.

The argmax or argmin function forms part of a neural network process that includes a neural network. The argmax or argmin function may be part of a neural network of the neural network process or separate from the neural network, e.g. used in the pre-processing of data input to the neural network or the post-processing of data output by the neural network. Thus, the neural network may comprise the argmax function or argmin function. Alternatively, the neural network process may comprise the neural network and the argmax or argmin function separately.

"Fixed-function", in this context, refers to the property of the circuitry that the logic it implements cannot be reconfigured after manufacture (or at least cannot be reconfigured extensively). This is in contrast to field programmable logic, for example, which is reconfigurable. It is also in contrast with general purpose processor hardware, which is fully programmable to implement any (arbitrary) function or algorithm. The hardware accelerator may be comprised in an application specific integrated circuit (ASIC). The behaviour of the fixed-function circuitry may be programmable to a limited extent. A module of fixed-function circuitry may be able to perform its fixed function under the control of a limited set of parameters, for example. Each module may therefore be reconfigurable only in the sense that it can implement, for example, convolution or pooling with various strides and kernel sizes, but it is not fully programmable in the sense that it could execute an arbitrary algorithm.

The same circuit elements are used to process the neural network as to perform the argmax or argmin function. Thus, the same fixed-function circuitry configured to perform particular elementary neural network operations for the neural network are configured to perform the relevant elementary neural network operations for carrying out the argmax/argmin function.

Thus, there is not separate fixed-function circuitry for performing the neural network and for performing the argmax/argmin function. Rather, it is not possible to delineate or separate the fixed-function circuitry that performs both the argmax/argmin function and the neural network from one another.

The step of mapping the argmax or argmin function may comprise mapping the neural network process to a set of elementary neural network operations.

There is also proposed computer readable code configured to cause any herein described method to be performed when the code is run. There is also proposed computer readable storage medium having encoded thereon the computer readable code. There is also proposed a non-transitory computer-readable medium or data carrier having encoded thereon computer readable code configured to cause any herein described method to be performed when the code is run (e.g., by a data processing system).

There is also disclosed a data processing system for processing data according to a neural network process. The data processing system comprises: a hardware accelerator comprising fixed-function circuitry configured to perform a set of available elementary neural network operations; and a controller configured to: receive a definition of a neural network process to be performed on the data, the neural network process comprising a neural network with an associated argmax or argmin function; map the argmax or argmin function to a set of elementary neural network operations, wherein the set of elementary neural network operations comprises only elementary neural network operations from the set of available elementary neural network operations; process the data according to the neural network process, using the fixed-function circuitry of the hardware accelerator to perform the neural network with the associated argmax or argmin function, wherein the argmax or argmin function is performed using the set of elementary neural network operations, wherein the data comprises image data and/or audio data; wherein each of the set of elementary neural network operations is selected from a list consisting of: an element-wise subtraction operation; an element-wise addition operation; an element-wise multiplication operation; an element-wise maximum operation; an element-wise minimum operation; a max pooling operation or min pooling operation; a magnitude operation; and one or more lookups operations using one or more look-up tables.

The hardware accelerator may comprise any one of, or any combination of two or more of: an activation unit, comprising an LUT; a local response normalisation unit, configured to perform a local response normalisation; an element-wise operations unit, configured to apply a selected operation to every pair of respective elements of two tensor of identical size; one or more convolution engines, configured to perform convolution operations; and a pooling unit, configured to perform pooling operations, including max pooling and/or min pooling.

Embodiments provide a method of manufacturing, using an integrated circuit manufacturing system, any herein described data processing system.

Embodiments also provide a method of manufacturing, using an integrated circuit manufacturing system, any herein described data processing system, the method comprising: processing, using a layout processing system, a computer readable description of the data processing system so as to generate a circuit layout description of an integrated circuit embodying the data processing system; and manufacturing, using an integrated circuit generation system, the data processing system according to the circuit layout description.

Some embodiments provide an integrated circuit definition dataset that, when processed in an integrated circuit manufacturing system, configures the integrated circuit manufacturing system to manufacture any herein described data processing system.

There is also provided a non-transitory computer readable storage medium having stored thereon a computer readable description of any herein described data processing system that, when processed in an integrated circuit manufacturing system, causes the integrated circuit manufacturing system to manufacture an integrated circuit embodying the data processing system.

There is also provided a non-transitory computer readable storage medium having stored thereon a computer readable description of any herein described data processing system which, when processed in an integrated circuit manufacturing system, causes the integrated circuit manufacturing system to: process, using a layout processing system, the computer readable description of the data processing system so as to generate a circuit layout description of an integrated circuit embodying the data processing system; and manufacture, using an integrated circuit generation system, the data processing system according to the circuit layout description.

There is also provided an integrated circuit manufacturing system configured to manufacture any herein described data processing system.

There is also provided an integrated circuit manufacturing system comprising: a non-transitory computer readable storage medium having stored thereon a computer readable description of any herein described data processing system; a layout processing system configured to process the computer readable description so as to generate a circuit layout description of an integrated circuit embodying the data processing system; and an integrated circuit generation system configured to manufacture the data processing system according to the circuit layout description.

The layout processing system may be configured to determine positional information for logical components of a circuit derived from the integrated circuit description so as to generate a circuit layout description of an integrated circuit embodying the data processing system.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
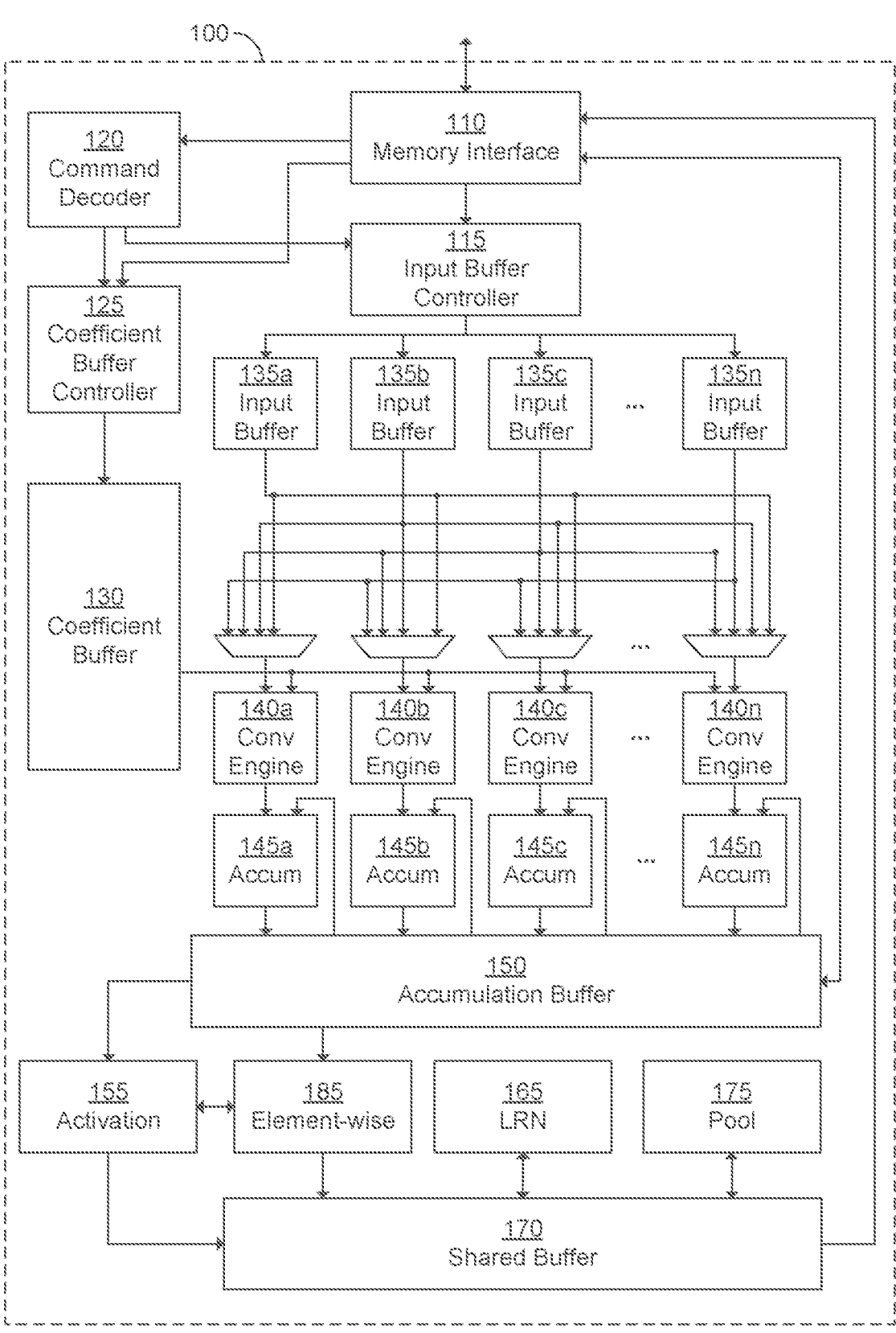
FIG. 1 illustrates a hardware accelerator in which embodiments may be implemented.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. Embodiments hereafter described provide approaches for performing an argmax/argmin function, a pooling function, an unpooling function and/or a backward pooling function.

Faced with a desire to implement one such function in a system using a neural network accelerator, one approach could be to design and implemented a dedicated hardware module or hardware accelerator specifically designed for performing the function. This hardware module could be included in the NNA, where it takes responsibility for performing the function, as needed.

Unlike the operations performed by a CPU, the (neural network) operations performed by an NNA are not designed to be a flexible or complete set of general-purpose operations. Instead, each neural network operation is specialised to perform a particular computationally intensive neural network calculation quickly and efficiently. The trade-off is that an NNA has a very limited capacity to perform functions beyond this specialised set.

Another alternative is to implement such a function, e.g. using general-purpose software, in general-purpose hardware (outside of the NNA) able to communicate with the NNA.

Providing a dedicated hardware module in an NNA may allow for a fast (e.g. optimized) performance of the function evaluation. However, it has the drawback that the dedicated hardware module occupies additional area, and may increase power consumption, in the integrated circuit. Moreover, because the evaluation of such functions typically represents a small part of the workload of the NNA, the utilisation of the dedicated hardware module will be low, for most typical neural networks. In other words, a dedicated module will be inactive most of the time, and therefore be an inefficient use of design, resource, space, material and manufacturing capabilities.

Evaluating such functions in general purpose hardware (positioned off-chip to the NNA) allows for flexibility, and avoids leaving large areas of the NNA underutilised; however, it is typically less efficient, because the hardware is less specialised. More importantly, there is an overhead in transferring the necessary data from the NNA to the general-purpose hardware (e.g. CPU), i.e. transferring the data off-chip. This typically involves the NNA writing the data to a memory, and the CPU reading the data from the memory, before performing the function. This is likely to slow down the evaluation of the layer, especially if—as is often the case—the speed of memory access dominates. This may also result in the NNA stalling and waiting for the function to complete, e.g. if the next operation to be performed depends on an output of the function. This may result in performance degradation, especially for neural networks that contain multiple layers that require such functions.

Still another alternative would be to include one or more general programmable units, such as a CPU or digital signal processor (DSP), within the NNA itself. This would in one sense be a hybrid of the two possible solutions mentioned above. It would avoid the need to consume system bandwidth in order to hand over the evaluation of each function to an external general-purpose processor; however, it would have the disadvantages of increased hardware/software complexity, increased power consumption and greater integrated circuit area occupied.

Similarly, it would also be beneficial if other procedures that currently make use of an argmax/argmin function, a pooling function, an unpooling function and/or a backward pooling function could be implemented within existing NNA's without the need for dedicated hardware or outsourcing the procedure to an off-chip processor.

In particular, any of these functions may be associated with a neural network that forms part of a neural network process executed using the NNA (i.e. the hardware accelerator). In particular, one or more of these functions may form part of the neural network and/or the pre-processing of data input to the neural network and/or the post-processing of data output by the neural network.

Examples according to the present disclosure provide ways to perform an argmax/argmin function, a pooling function, an unpooling function and/or a backward pooling function using existing component operations that are already available on an exemplary NNA. Such functions may be used, for instance, when performing a neural network process using the NNA, e.g. when simulating a neural network using the NNA or training a simulated neural network using the NNA. In some instances, the functions could be accessed by an external component (to the NNA) to perform this functionality.

It has previously been explained how an argmax/argmin function can be used to benefit a wide variety of possible applications, e.g. in a neural network process, e.g. performing a final decision step for a classification algorithm and/or for use in layers of a neural network. The present disclosure proposes approaches for using and adapting existing hardware operations (i.e. fixed-function circuitry) to perform an argmax/argmin function. Thus, a technical effect is achieved regardless of the application being run, as the argmax/argmin hardware implementation may be implemented in any suitable function to be performed. Moreover, the proposed approach controls fixed-function circuitry in a new way, in order to perform a new function using fixed-function circuitry.

In this way, an argmax or argmin function can be included in an neural network process that includes a (implementation of a) neural network, either as part of the neural network or to process data input into, or output from, the neural network (i.e. during pre- or post-processing of data of the neural network).

The present disclosure further proposes approaches for performing a binary argmax/argmin function, which is usable in a proposed approach for performing a pooling function and is useful for a corresponding unpooling or backward pooling function. Accordingly, approaches for performing a pooling and corresponding unpooling or backward pooling function are also described.

In a similar manner, any of these functions can be included in a neural network process that includes a (implementation of a) neural network, either as part of the neural network or to process data input into, or output from, the neural network (i.e. during pre- or post-processing of data of the neural network).

FIG. 1 illustrates an exemplary hardware accelerator 100 in which embodiments can be implemented. A full description of the features of this exemplary hardware accelerator will be provided later in this disclosure.

As shown in FIG. 1, an exemplary hardware accelerator 100 (also referred to herein as a neural network accelerator or NNA) has fixed-function circuitry, which typically includes at least the following fixed-function hardware units:

A set of convolution engines 140, specialised at convolution operations (and which may also be used in deconvolution operations);

An element-wise operations unit 185, specialised at performing the same operation to every element of a tensor or to pairs of respective elements of two tensors;

An activation unit 155, specialised at applying an activation function (which may be selectable, configurable, or fully programmable) to every element of a tensor, an activation function may comprise using a lookup table to modify each element of the tensor (i.e. using a lookup operation);

A local response normalisation (LRN) unit 165 (or normalisation unit, for short), specialised at performing neighbourhood-based normalisation operations;

A pooling unit 175, specialised at performing pooling operations, such as max pooling and min pooling; and A memory manipulation module (optional and not shown), specialised at reshaping the manner and order of dimensions of multi-dimensional tensors presented in memory.

Examples of the present disclosure use elementary neural network operations, executed by the fixed-function circuitry, e.g. the fixed-function hardware units, to implement an argmax/argmin function (e.g. when performing a neural network process that makes use of an argmax/argmin function). An underlying concept of the present disclosure is the recognition that the neural network operations performed by the fixed-function circuitry of the NNA can be repurposed to implement the argmax/argmin function. It is recognised that various approaches to adapting the available functionality of the fixed-function circuitry could be used.

In particular, it has been recognised that an argmax/argmin function can be carried out by performing a combination of one or more of the following elementary neural network operations:

an element-wise subtraction operation;

an element-wise multiplication operation;

an element-wise maximum operation;

an element-wise minimum operation;

a max pooling operation;

a min pooling operation;

a magnitude operation and one or more lookups operations using one or more lookup tables.

This list may be referred to as the "restricted list" of elementary neural network operations. The list may, for pooling, unpooling and/or backward pooling operations be supplemented with a (grouped) convolution process and/or a (grouped) deconvolution process. An alternative label for a magnitude operation is an absolute value operation.

Thus, an argmax or argmin function can be represented by a plurality of elementary neural network operations from the set of available elementary neural network operations. In particular, there may be a restricted list of operations, such as those set out above, that can be used to perform or carry out the argmax/argmin function.

In the present implementation, the calculations may be performed in fixed-point arithmetic. Experiments have shown that the fixed-point implementation is sufficiently accurate that it does not significantly degrade the overall accuracy of the exemplary neural networks tested.

Figure 2:
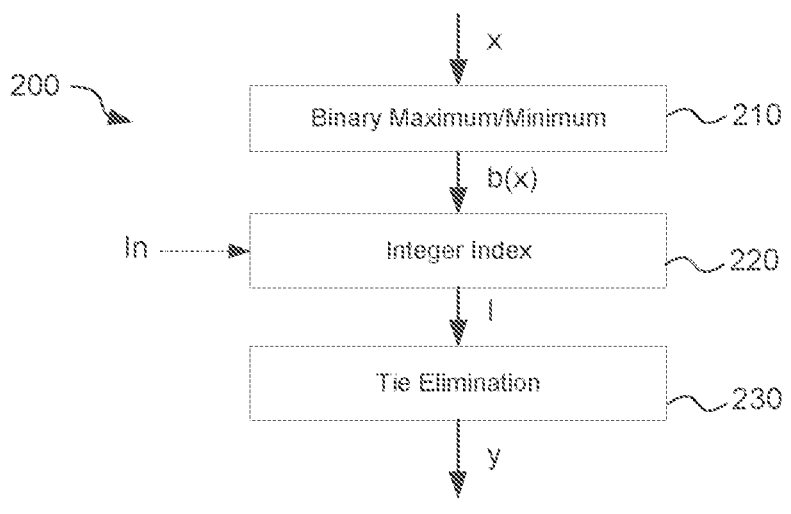
FIG. 2 illustrates an approach for performing an argmax/argmin function.

FIG. 2 illustrates an overview of an approach for performing an argmax/argmin function 200. In particular, the argmax/argmin function 200 has been restructured/re-cast to form a sequence of operations that can be carried out using the available functionality and operations provided by the fixed-function circuitry of the NNA.

The argmax/argmin function processes an input tensor x to generate an output value y. The output value y provides an index (in the input tensor) of an element that contains a maximum value (for an argmax function) or a minimum value (for an argmin function) amongst all values contained within the input tensor. The input tensor may comprise, for instance, a vector or a matrix. The output value y may, for instance, comprise a single value identifying the relative index in the input tensor.

A tensor is formed of one or more elements (or "entries") that each contain a value. An example of an input tensor is image data (e.g. where each element represents a property of a pixel, i.e. is associated with a particular pixel, and contains a certain value). By way of example, each element may contain a value representing a particular colour, intensity or transparency property of a pixel. Another example of an input tensor is audio data. Another example of an input tensor is an output of a layer of a neural network.

In some examples, an input tensor may comprise a subset of data from a dataset. For instance, an input tensor may comprise a vector containing different values representing different channels of a same pixel of image data.

As another example, a tensor may be a sub-tensor of a larger tensor, e.g. a sub-tensor representing a part of a tensor over which a filter/kernel is positioned during a pooling operation being performed on the larger tensor. In particular, an argmax/argmin function may be performed multiple times for any given input tensor, e.g. on each of a plurality of sub-tensors of the input tensor (where a sub-tensor may represent a receptive field for an output). This will, conventionally, produce an output tensor having multiple argmax/argmin value outputs, with each argmax/argmin function performed contributing a different value.

The following description defines an argmax/argmin function as calculating a single value that represent the index of a maximum/minimum value within an input tensor. However, in practice, an input tensor usually forms part of a larger tensor upon which multiple argmax/argmin functions are performed, e.g. as part of an argmax/argmin process.

By way of explanation, processing a particular tensor using an argmax/argmin process may comprise processing each of a plurality of sub-tensors (of the particular tensor) with a respective argmax/argmin function. Each sub-tensor may represent a (potentially overlapping) part of the (larger) particular tensor. In this way, each sub-tensor represents a separate example of an input tensor.

By way of example, each sub-tensor may represent different channels of a multi-dimensional tensor, i.e. each channel is treated as a different sub-tensor. In this scenario, when an exemplary input tensor of size: width×height× channel, i.e. W×H×C, is processed using an argmax/argmin process (which treats each channel as a different sub-tensor to be processed using a respective argmax/argmin function) then W×H individual argmax/argmin functions are performed, to produce an output tensor of size W×H×1.

The function 200 is implemented by a plurality of elementary neural network operations. In particular, the plurality of elementary network operations are configured to perform a sequence of operations or sub-functions to carry out the function 200.

The operations that form function 200 are performed in sequence, i.e. one after the other.

The function 200 comprises a binary maximum/minimum operation 210. A binary maximum operation is performed if the function 200 is an argmax function, and binary minimum operation is performed if the function 200 is an argmin function.

The binary maximum/minimum operation produces a binary tensor b(x) having the same spatial size as the input tensor. Each element (or entry) in the binary tensor corresponds to an (different) element in the input tensor, i.e. represents or contains information about a corresponding element in the input tensor. Each element contains a binary value indicating whether or not the corresponding element of the input tensor has a value equal to the maximum/minimum value (of all values) contained in the input tensor.

Examples of how to carry out the binary maximum/minimum operation will be provided later.

The function 200 then moves to an integer index operation 220. The integer index operation is applied to the binary tensor b(x) and identifies one or more indexes I of the binary tensor. The identified indexes are indexes (of the binary tensor) of elements in the binary tensor that have a value indicating that the value of the corresponding element in the input tensor is equal to the maximum/minimum value.

Thus, the integer index operation 220 identifies the indexes of elements in the binary tensor that have a certain binary value, where the certain binary value indicates that the value of the element of the input tensor (represented by the said element of the binary tensor) is equal to the maximum/minimum value.

The integer index operation may be configured to identify the indexes of all elements in the binary tensor b(x) that meet the above-identified requirements. Thus, integer index operation may identify the indexes I of all elements in the binary tensor that have a value indicating that the value of the corresponding element in the input tensor is equal to the maximum/minimum value.

Examples of how to carry out the integer index operation will be provided later.

The function 200 then moves to a tie elimination operation 230. The tie elimination operation selects a single one of the one or more identified indexes to provide the output y of the argmax or argmin function.

Various approaches for performing a tie elimination operation 230 may be used. In one example, the first (e.g. earliest or smallest) index of the identified indexes I may be identified. In another example, the last (e.g. latest or largest) index of the identified indexes may be identified. Of course, if only a single index is identified in operation 220, this index may be selected as the output of the argmax/argmin function.

More complete examples of approaches for performing the tie elimination operation 230 will be provided later.

Thus, the argmax/argmin function may be subdivided into a number of separate functions, each of which can be performed by carrying out one or more elementary neural network functions. In particular, it has been identified that the above operations 210-230 can be carried out using the restricted list of elementary neural network functions, previously identified.

Figure 3:
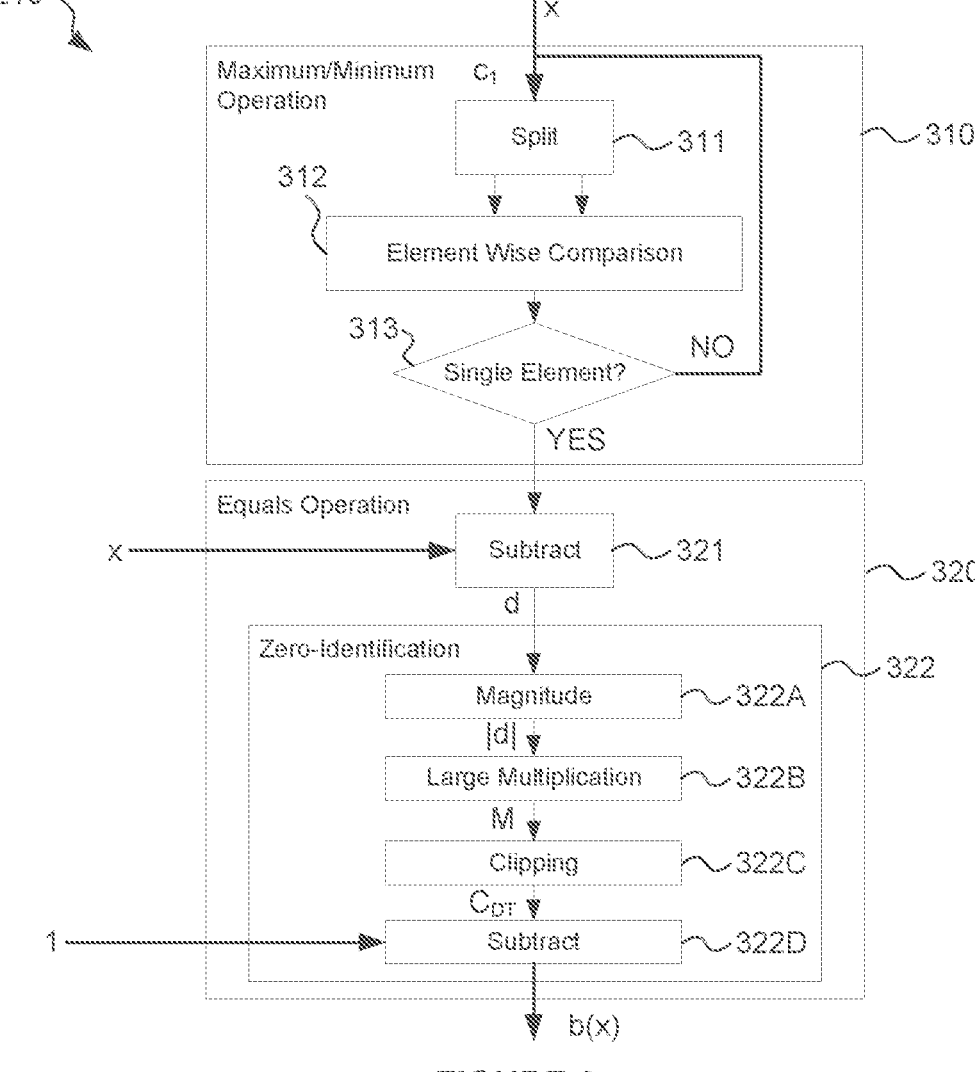
FIG. 3 illustrates an approach for performing a binary maximum/minimum operation.

FIG. 3 is a flowchart illustrating an example approach for performing the binary maximum/minimum operation 210, to process the input tensor x to generate the binary tensor b(x). The (sub-)operations of the binary maximum/minimum operation 210 are performed in sequence.

The binary maximum/minimum operation 210 comprises performing a first maximum/minimum operation 310. The first maximum/minimum operation is applied to the input tensor to identify the maximum (for an argmax operation) or a minimum (for an argmin operation) value contained in the input tensor.

In one example, the first maximum/minimum operation is performed using a max pooling operation or min pooling operation (i.e. a max/min pooling operation). Either of these operations can be carried out by the pooling unit of the NNA, as previously explained, and therefore relate to elementary neural network operations.

In some examples, a max pooling or min pooling operation may comprise a preliminary reformatting process, which formats a tensor into a form suitable for processing by the pooling unit. This preliminary reformatting processing may use a memory manipulation module (MMM) to process the tensor. The processed tensor may then be processed by the pooling unit to identify the maximum/minimum value. The identified value could then be subject to a further reformatting process (by the memory manipulation module) to reformat the maximum/minimum value to a correct (original) dimension.

Purely by way of example, a maximum may be evaluated by a transpose (using the MMM), a max pooling (using the pooling unit), and a further transpose (using the MMM).

In another example, and as illustrated in FIG. 3, the first maximum/minimum operation 310 can be performed using a series of element-wise maximum (for an argmax operation) or minimum (for an argmin operation) operations. This can be carried out by the element-wise operations unit 185 (FIG. 1).

In this illustrated example, a first maximum/minimum iterative process is performed.

The first maximum/minimum iterative process comprises iteratively processing a first comparative tensor $c_1$ until a (single) maximum/minimum value is identified. For the first iteration of the maximum/minimum iterative process, the input tensor is used as the first comparative tensor. For subsequent iterations, a tensor (the "new first comparative tensor") produced by the first maximum/minimum iterative process is used as the first comparative tensor.

The first maximum/minimum iterative process 310 comprises a step 311 of splitting the first comparative tensor into two parts (a first part and a second part). These two parts are preferably of (near) equal size.

The first maximum/minimum iterative process 310 then performs a step 312 of performing an element-wise comparison between the two parts of the first comparative tensor. The element-wise comparison compares corresponding pairs of elements from the first part and the second part to identify, for each pair, the element containing the highest (for an argmax operation) or lowest (for an argmin operation) value. A new comparative tensor is generated, containing an element for each pair (from the first and second parts), each having a value of the highest/lowest value in the respective pair.

The maximum/minimum iterative process is repeated until the first comparative tensor $c_1$ contains only a single element, which will have a value equal to the maximum/minimum value contained in the input tensor. This may be determined in a determination step 313.

Figures 4, 5:
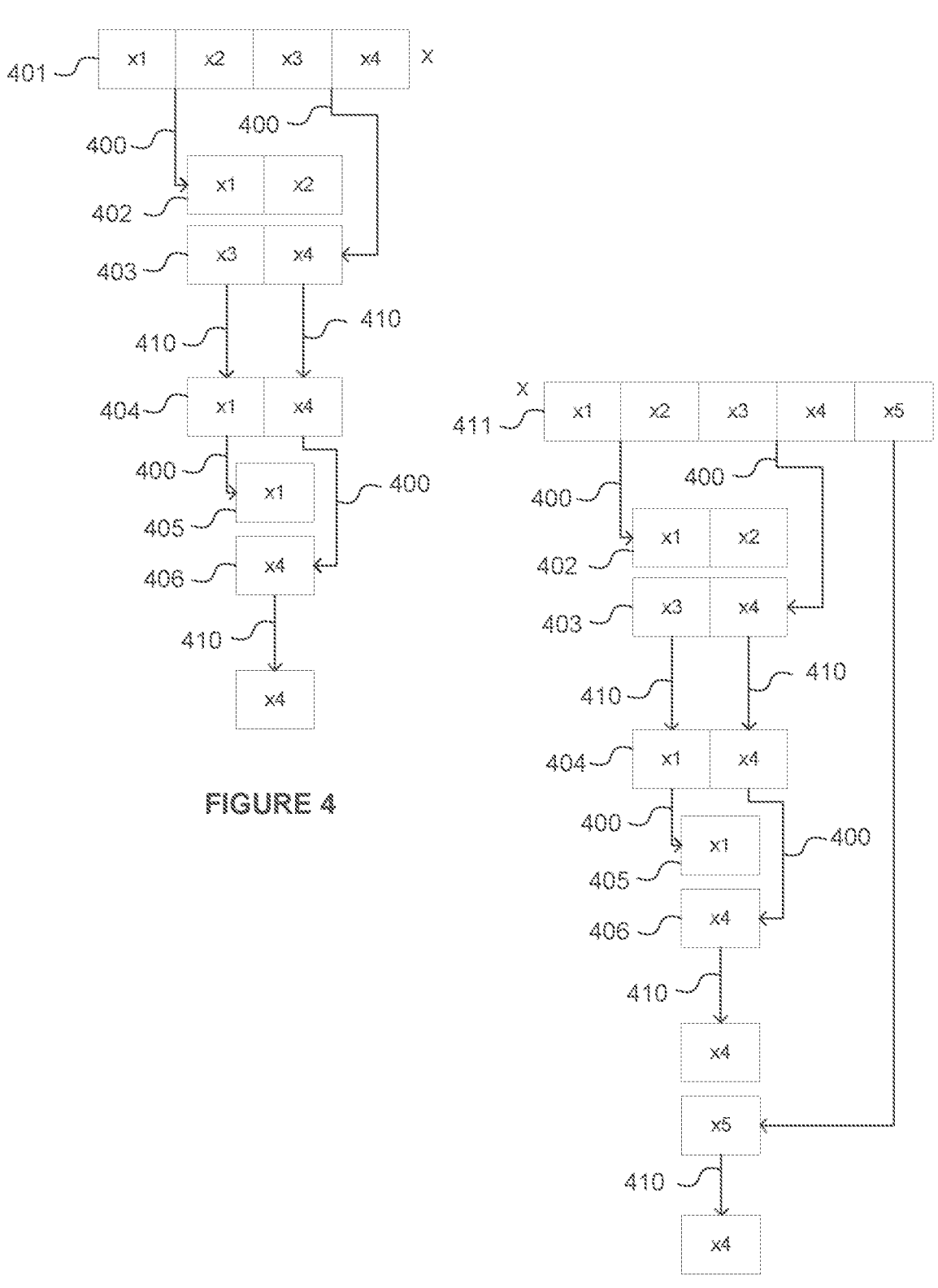
FIGS. 4 and 5 illustrate approaches for performing a maximum operation using an element-wise processing technique.

FIG. 4 illustrates the application of an iterative element-wise maximum approach to an exemplary tensor-here an input vector "x" 401, for simplicity. The skilled person will appreciate how this approach could be adapted for performing a minimum operation (e.g. to identify a minimum value contained in a tensor).

The input vector 401 has four entries (and therefore four elements), each containing a numerical value represented by x1, x2, x3 and x4. First, the vector 401 is split 400 into two sub-vectors 402, 403 each having two elements. Using an element-wise maximum operation 410, the first element of the first sub vector 402 is compared with the first element of the second sub-vector 403. Similarly, the second element of the sub-vector 402 is compared with the second element of the sub-vector 403. This comparison results in a vector 404. In the example of FIG. 4, x1>x3 and x4>x2; therefore, the vector 404 output by the first element-wise maximum operation consists of x1 and x4. The vector 404 is split 400 to produce sub-vectors 405 and 406, which are again compared using the element-wise maximum operation 410. This returns the maximum element "M" of the input vector 401—which, in this example, happens to be x4. While this example used a vector having four elements, the process applies in the same fashion to vectors having more elements or to tensors with more dimensions.

The approach illustrated by FIG. 4 can be performed on any input tensor having a size that is a power of 2, to facilitate the repeated splitting into halves during the maximum/minimum iterative process. If the input tensor does not have a size that is a power of 2 then padding may be used to increase the size to the nearest power of 2. The input tensor could be padded with zeros, in some examples (e.g. for an argmax function, where the operation 310 is a maximum operation) or a very large number such as 232 (e.g. for an argmin operation, where the operation 310 is a minimum operation).

If the values in the original input tensor are all negative, then padding with zero or a larger number such as 232 would cause a maximum operation to inaccurately return a maximum value of zero or the larger number. Thus, for better conditioning, padding (when the operation 310 is a maximum operation) could be done with a very large negative value instead, e.g. 2-32. This would be less likely to affect the correct calculation of the maximum.

An alternative to padding is to split the tensor into more than two sub-tensors, each sub-tensor having a size that is a power of 2. For example, a tensor with 5 elements may be split into two tensors with 2 elements each and a final tensor with 1 element. The two tensors with 2 elements can be reduced by taking the element-wise maximum, as described above, to produce a single tensor with two elements, which is subsequently split into two 1-element tensors. The resulting 1-element tensors can be compared to produce a tensor with 1 element. Finally, this tensor can be compared with the remaining tensor with 1 element, to return the maximum of the original tensor.

This process is illustrated by way of example in FIG. 5. The exemplary input tensor, the vector "x" 411, differs from the input tensor in FIG. 4 by the addition of a fifth element, containing a numerical value x5. The first four elements are processed as illustrated in FIG. 4. This is then followed by a final, additional step, in which the maximum over the first four elements, x4, is compared with the fifth element, x5, in a further element-wise maximum operation 510. The result of this comparison is the overall maximum over the five elements. (In this example, as illustrated, the maximum happens still to be x4).

This approach provides a mechanism for performing a maximum/minimum operation that makes use of an element-wise comparison operation, and therefore an elementary neural network operation.

Turning back to FIG. 3, the binary maximum/minimum operation 310 also comprises performing an equals operation 320. The equals operation modifies the value of each element in the input tensor x to a binary value, to thereby generate the binary tensor b(x).

In particular, the value of an element is set to be a first binary value (e.g. "1" or "0") if the (previous) value of that element is equal to the maximum/minimum value identified by maximum/minimum operation 310 (where maximum is used if an argmax function is to be performed and a minimum is used if an argmin function is to be performed). The value of an element is set to be a second (different) binary value (e.g. the other of "1" or "0") if the (previous) value of that element is not equal to the maximum/minimum value identified by operation 310.

Put another way, the equals operation modifies the value of the element to be either a first binary value or a second, different binary value responsive to whether or not the value of the element contains the maximum/minimum value contained in the input tensor, to thereby produce the binary tensor.

In the illustrated example, the equals operation comprises 320 performing a subtraction operation 321 and a (first) zero-identification operation 322.

The subtraction operation 321 comprises subtracting the maximum (for an argmax function) or minimum (for an argmin function) value identified in operation 310 from the value of each element of the input tensor x. This produces a difference tensor d. In the difference tensor, elements that corresponding to elements of the input tensor that had the maximum/minimum value will have a value of 0. All other elements will have non-zero values.

The subtraction operation can be performed using an element-wise subtraction operation, i.e. one of the elementary neural network operations. As an alternative example, the subtraction operation could be performed using an element-wise multiplication operation (e.g. to multiple all values of the input tensor by −1 or the maximum/minimum value by −1) and an element-wise addition operation.

The (first) zero-identification operation 322 sets all zero values (in the difference tensor d) to be equal to the first binary value and all non-zero values to be equal to the second binary value. In this way, the output of the (first) zero-identification operation provides a binary tensor b(x) having elements with a value that corresponds to whether or not the corresponding element of the input tensor has the maximum/minimum value of the input tensor.

The (first) zero-identification operation 322 could be performed using a lookup operation. Thus, an activation unit may be capable of setting zero values to the first binary value and other values to the second binary value.

In another example, as illustrated, the (first) zero-identification operation can be performed by performing a sequence of performing: a magnitude operation 322A; a large multiplication operation 322B; a clipping operation 322C; and a subtract operation 322D.

The magnitude operation 322A comprises replacing each value in the difference tensor with the absolute (magnitude) value to produce an absolute difference tensor |d|. Thus, an alternative label for the magnitude operation is an absolute value operation, as it determines the absolute value (i.e., magnitude) of each value in a tensor. A magnitude operation is an example of an elementary neural network operation, and could be performed by the activation unit.

The large multiplication operation 322B comprises multiplying each value in the absolute difference tensor by a large value (e.g. $2^{32}$) to produce a multiplied difference tensor. The large multiplication operation 322B could be performed using an element-wise multiplication operation, e.g. performed by the element-wise operations unit.

The clipping operation 322C comprises clipping each value in the multiplied difference tensor M to a maximum value of 1, to produce a clipped difference tensor. This can be performed by the activation unit, e.g. using a look-up operation or the like.

The subtract operation 322D comprises subtracting each value in the clipped difference tensor from 1 to produce the binary tensor. This can be performed using an element-wise subtraction operation, e.g. performed by the element-wise operations unit.

The above example demonstrates how various approaches for performing the (first) zero-identification operation, making use of the elementary neural network operations, could be performed.

Turning back to FIG. 2, the integer index operation 220 may be performed by performing a binary tensor multiplication operation on the binary tensor. This operation comprises multiplying the binary tensor b(x) by an index tensor In, and could be performed using an element-wise multiplication operation (i.e. one of the available neural network operations). The index tensor has a same spatial size as the binary tensor, where each element in the index tensor corresponds to an element of the binary tensor. The value of each element in the index tensor is an index value identifying an index of the corresponding element in the binary tensor.

The binary tensor multiplication operation may only be performed if in the binary tensor: a value of 1 indicates that the corresponding element of the input tensor has a value equal to the maximum/minimum value contained in the input tensor; and a value of 0 indicates the corresponding element of the input tensor does not have a value equal to the maximum/minimum value contained in the input tensor.

Thus, in some preferred examples, the "first binary value" is 1 and the "second binary value" is 0.

The output of the binary tensor multiplication tensor is a maximum index tensor. The maximum index tensor contains the one or more indexes of the input tensor. In particular, all non-zero values of the maximum index tensor are the one or more indexes of the input tensor.

The binary tensor multiplication operation may be performed by carrying out an element-wise multiplication operation (i.e. an elementary neural network operation) using the binary tensor b(x) and the index tensor In.

The index tensor In may be generated off-chip, e.g. by an index generator, or stored using a lookup table, as the size of the input tensor may be fixed and/or known in advance. Thus, the index tensor may be stored in a look-up table.

The tie elimination operation 230 may be carried out by performing a second maximum (for an argmax function) or second minimum (for an argmin operation) operation on the maximum index tensor. The output of the second maximum/minimum operation is the output y of the argmax/argmin function 200. If the index tensor In is 1-based (i.e. starts at a value of 1 rather than 0), the output of the second maximum/minimum operation −1 will be the output y of the argmax/argmin function.

The second minimum operation is configured to identify the lowest non-zero value contained in the maximum index tensor. This avoids values which have been set to 0 (e.g. as a result of the zero-identification operation) from being unintentionally output as the output of the argmin function.

Where the indexing of a tensor is zero-based (e.g. index value 0 represents or identifies the first entry of a tensor), the index tensor In may add 1 to each index value included in the index vector. This would mean that the first entry of the index tensor contains a value 1, rather than a (correct for zero-based indexing) value 0 (e.g. so that an Index tensor for a binary tensor having 4 entries is [1,2,3,4], rather than [0,1,2,3]). This avoids, following integer index operation 220, the first entry in the maximum index tensor always being zero (and therefore, potentially, never correctly identified as being the output of the argmax/argmin). In this scenario the output y of the argmax/argmin function may be equal to the output of the second maximum/minimum operation minus 1, to correctly output a zero-based indexing value.

The second maximum/minimum operation can be performed using an analogous approach to the first maximum/minimum operation, e.g. using a max/min pooling operation or performing one or more element-wise maximum/minimum operations between different parts of the maximum index tensor. A complete description of this process is omitted for the sake of conciseness.

The foregoing description thereby provides an example approach for adapting an argmax/argmin operation to be carried out be elements of fixed-function hardware of a hardware accelerator. The skilled person would appreciate that other approaches for using elementary neural network operations to perform the argmax/argmin function could be performed.

One embodiment in which the previously described approach for performing an argmax/argmin function could be employed is for use in a pooling and corresponding unpooling (or backward pooling) operation used during a neural network process (i.e. a process that makes use of a neural network).

In particular, it has been identified that the proposed approach for performing argmax/argmin facilitates the performance of an appropriately configured pooling and corresponding unpooling (or backward pooling) operation using the elementary neural network operations that have been made available by the hardware accelerator.

A conventional (max/min) pooling operation, performed across the entirety of a single tensor, generates a pooled value (representing a maximum/minimum value contained in the tensor) and an identifier that identifies the location of the pooled value within the original single tensor. This identifier is conventionally identified using an Argmax/Argmin operation.

Of course, it will be appreciated that more than one of these pooling operations may be performed (simultaneously or in succession) when processing a particular input tensor, e.g. a respective pooling operation could be performed on a plurality of sub-tensors within the input tensor (defined by a position of a kernel or filter on the input tensor).

The present invention modifies this known pooling operation to replace the argmax/argmin operation with a binary argmax/argmin operation. A binary argmax/argmin produces a one-hot vector (i.e. instead of a value) indicating the relative location of the max/min value within the (sub-) tensor. Thus, an index value with a vector that is the binary encoding of that integer value. Thus, if a (sub-) tensor undergoing a pooling operation has four entries, and an Argmax function would return a value of [2] for that tensor, a Binary Argmax function would return a value [0, 0, 1, 0]. This effectively means that an output of a binary argmax/argmin function has an extra dimension compared to the output of a conventional argmax/argmin function—where the extra dimension is used to encode an index value in vector form.

Figure 6:
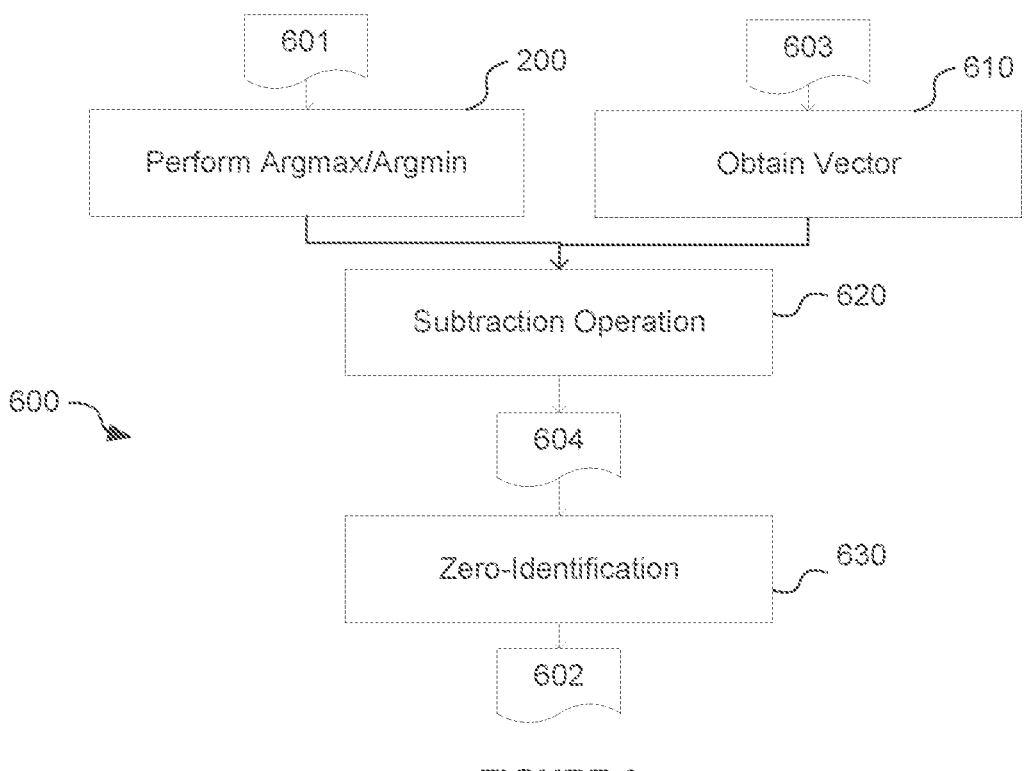
FIG. 6 illustrates an approach for performing a binary argmax/argmin function.

A binary argmax/argmin function may take place by performing the process 600 illustrated by FIG. 6. The binary argmax/argmin function is configured/cast to form a sequence of operations that can be carried out using the available functionality and operations provided by the fixed-function circuitry of the NNA.

For any given input tensor, the process 600 may be repeated more than one times, each representing a different receptive field of the input tensor, i.e. a sub-tensor indicated by a particular filter/kernel size and position.

The binary argmax/argmin function 600 is performed on a first input tensor 601 to output a one-hot vector 602 representing an argmax or argmin of the first input tensor. The process 600 is effectively formed of two stages, a first stage in which an argmax/argmin function is performed (e.g. using previously described approaches) and a second stage in which the output of the argmax/argmin function is converted into a one-hot vector.

The process 600 comprises performing an argmax/argmin function 200, such as those previously described with reference to FIGS. 2 to 5. This produces an identified index of the first input tensor, the identified index being a value representing the relative location of the max/min value within the first input tensor, i.e. the index value of the entry of the first input tensor that contains the max/min value of the first input tensor.

The process 600 also performs a vector obtaining operation 610 that obtains a first intermediate vector 603. The first intermediate vector 603 has a same number of entries as the first input tensor 601, each entry of the first intermediate vector containing an index value of a different entry of the first input tensor. Thus, if the first input tensor 601 contains N entries, so the first intermediate vector contains a corresponding N entries. The values of the entries in the first intermediate vector will thereby typically increase by 1 for each consecutive entry.

Like the index tensor previously described, the first intermediate vector 603 may be generated off-chip or stored using a lookup table, as the size of the first input tensor may be fixed and/or known in advance. Thus, the first intermediate vector may be stored in a look-up table.

The process then moves to a subtraction operation 620, which is applied to each element of the first intermediate vector. The subtraction operation subtracts the identified index of the first input tensor (i.e. the index value of the entry that contains the max/min value of the first input tensor) from each element of the first intermediate vector to produce a second intermediate vector 604. This process can be performed using an element-wise subtraction operation. As a result of the subtraction operation 620, the second intermediate vector 604 will contain a zero value element at a position corresponding to the identified index of the first input tensor (because that is the only position where the subtraction calculation amounts to subtracting that index value from itself), and non-zero values elsewhere.

The process then moves to a (second) zero-identification operation 630, which is applied to the second intermediate vector. The (second) zero-identification operation replaces any zero values in the second intermediate vector with a first binary value and any non-zero values in the second intermediate vector with a second, different binary value, to thereby produce the one-hot vector. One approach for performing such an operation has been previously described, for example, with reference to the (first) zero-identification operation 322 described previously and with reference to FIG. 3.

The method 600 may be applied to each of a plurality of sub-tensors within an overall input tensor, e.g. where each sub-tensor also undergoes a maximum/minimum pooling operation. The output of the maximum/minimum pooling operations performed across the overall input tensor produces a tensor having N dimensions (each entry representing a different pooled value for a different receptive field). The output of the binary argmax/argmin functions performed across the overall input tensor produces a tensor having N+1 dimensions, where the N+1th dimension represents the encoding of the argmax/argmin as a one-hot vector (i.e. the dimension of the one-hot vector).

Figure 7:
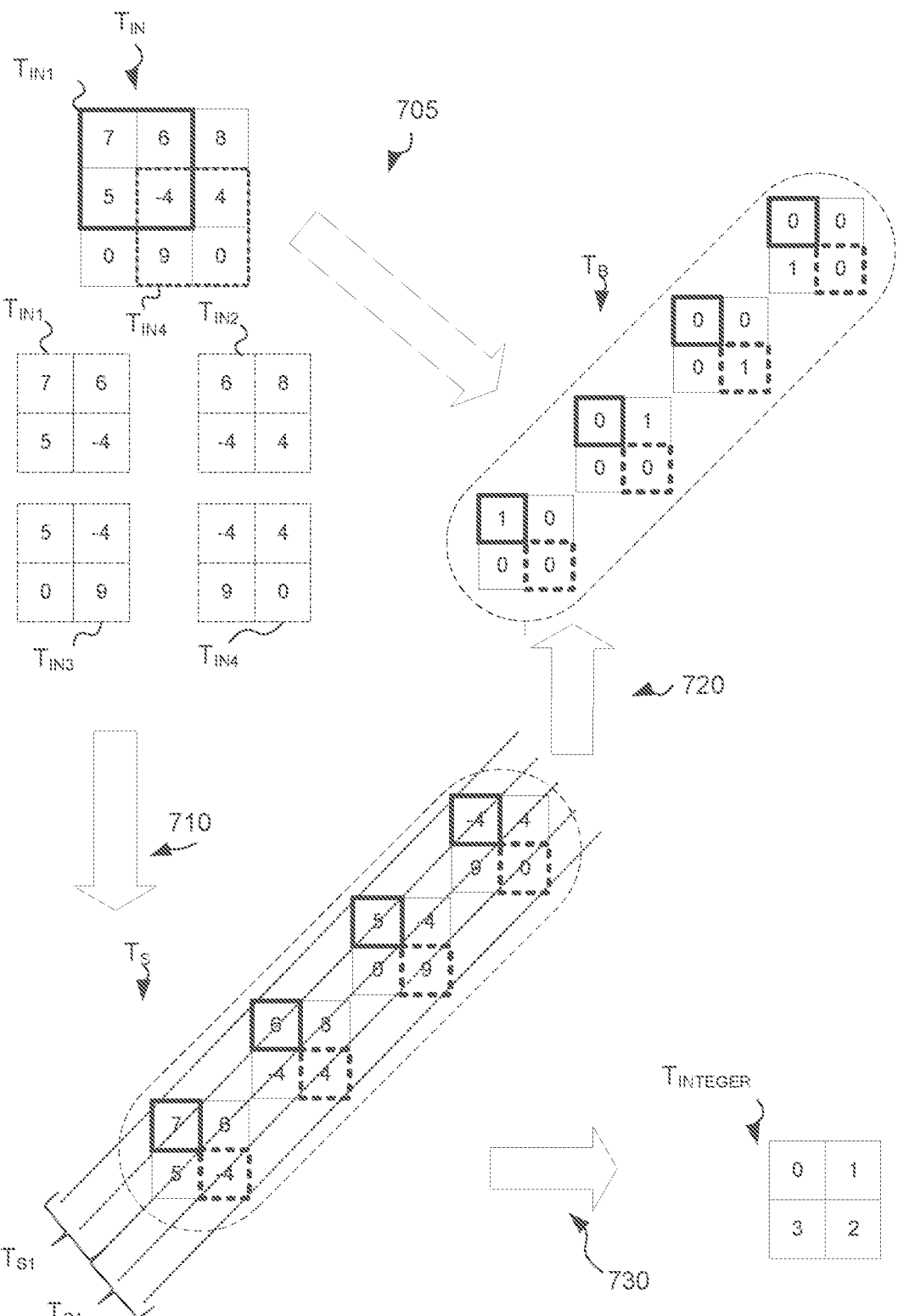
FIG. 7 illustrates an approach for performing binary argmax/argmin functions on an input tensor.

FIG. 7 illustrates two examples of processing an input tensor $T_{IN}$ using a binary argmax/argmin process that involves performing multiple binary argmax/argmin functions. The input tensor here comprises a 2-dimensional 3×3 matrix, however it will be appreciated that tensors of greater dimensions and/or size can be employed.

The input tensor $T_{IN}$ is conceptually divided into a plurality of sub-tensors. In the illustrated example, each sub-tensor is a different 2×2 sub-tensor within the 3×3 matrix $T_{IN}$, e.g. a first input sub-tensor $T_{IN1}$, a second input sub-tensor $T_{IN2}$, a third sub-tensor $T_{IN3}$ and a fourth sub-tensor $T_{IN4}$. The sub-tensors may represent the sub-tensors representing receptive fields that underlie different positions for a filter/kernel (e.g. for a max/min pooling process). In the illustrated example, there are four sub-tensors (i.e. there is a stride of 1 between the positions of the filter/kernel), of which only the first and fourth input sub-tensors are identified on the input tensor $T_{IN1}$ for the sake of clarity. The content of each sub-tensor is illustrated below the illustration of the input tensor $T_{IN}$ for improved understanding. Each sub-tensor is processed, e.g. in parallel, using a respective binary argmax/argmin function.

A first example of a binary argmax process 705 comprises directly processing each sub-tensor $T_{IN1}$, $T_{IN2}$ $T_{IN3}$, $T_{IN4}$ using a (respective) binary argmax function. In this way, each sub-tensor $T_{IN1}$, $T_{IN2}$ $T_{IN3}$, $T_{IN4}$ is configured to act as an input for a different argmax function.

A second example of a binary argmax process 710, 720 comprises reshaping 710 the input tensor $T_{IN}$ to separate sub-tensors from one another (e.g. separating sub-tensors by channel) so that they do not or no longer overlap one another, before processing 720 each reshaped sub-tensor using a respective binary argmax function. Avoiding overlap between sub-tensors is advantageous for some hardware accelerator circuitry, e.g. to reduce a likelihood of read/write memory access problems.

In this second example of a binary argmax process, the input tensor $T_{IN}$ undergoes a shaping process 710 to produce an overall shaped tensor $T_S$. In the shaping process 710 the values of each sub-tensor $T_{IN1}$, $T_{IN2}$ $T_{IN3}$, $T_{IN4}$ of the input tensor $T_{IN}$ are reconfigured to lie along a same channel (each sub-tensor contributing to a different channel), forming an overall shaped tensor $T_S$. Thus, a first sub-tensor $T_{IN}$ is shaped to lie along a first channel (forming first shaped tensor $T_{S1}$) and the fourth sub-tensor $T_{IN4}$ is shaped to lie along a second channel (forming fourth shaped tensor $T_{S4}$). This effectively separates the sub-tensors from one another, so that they no longer overlap one another.

The shaping process 710 may be performed using a space-to-depth function, that restructures elements formed in a W×H tensor to lie along a single channel (i.e. form a tensor of 1×1×C), where the number of C is equal to the total number of elements in the W×H tensor. A space-to-depth operation could be simultaneously performed for the whole input tensor by a depth-wise convolution with an appropriately configured binary constant filter.

Each channel of the shaped tensor $T_s$ is then processed using a respective argmax/argmin function in a process 720. Thus, elements lying within a same channel define an input tensor for a binary argmax/argmin function. Thus, in this example, a first shaped tensor $T_{S1}$ having values [7,6,5,−4] produces an binary argmax value of [1,0,0,0]. Repeating this process for each channel produces a binary argmax tensor $T_B$ from the overall shaped tensor $T_s$.

The process 720 described with reference to FIG. 7 also illustrates a further example of a binary argmax/argmin process. The process 710, 720 describes a respective binary argmax/argmin function processing each of a plurality of different (overlapping) sub-tensors of a 2-dimensional input tensor ($T_{IN}$), each sub-tensor being a two-dimensional part of the input tensor $T_{IN}$. The process 720 alone describes applying a binary argmax/argmin function to each of a plurality of different sub-tensors of a 3-dimensional input tensor $T_s$, each sub-tensor being a one-dimensional part of the input tensor $T_s$, e.g. along a particular dimension.

Thus, FIG. 7 illustrates an embodiment in which a respective argmax/argmin function is applied along different channel dimensions, i.e. to progress from the overall shaped tensor $T_S$ to the binary argmax tensor $T_B$. Thus, elements lying along a same dimension form an input tensor for a binary argmax/argmin function. This provides an example of performing a binary argmax/argmin process with respect to a particular dimension.

The skilled person would appreciate how a (non-binary) argmax/argmin process may similarly be applied with respect to a particular dimension, e.g. so that elements lying along a same dimension form an input tensor for an argmax/argmin function. This is conceptually illustrated by process 730 of FIG. 7, which demonstrates a channel-by-channel argmax procedure, to produce an output tensor $T_{INTEGER}$. The output tensor $T_{INTEGER}$ provides an argmax value for each sub-tensor (defined as a tensor lying along a particular channel) of the tensor $T_s$.

The proposed approach to establishing and using a binary argmax/argmin function (rather than an argmax/argmin function) facilitates a new approach to performing an unpooling or backward pooling function. In particular, an unpooling function is able to take place by using the output of the binary argmax/argmin function as one of the inputs (rather than the output of an argmax/argmin function). This approach avoids the need to perform a recursive loop, sometimes called a for loop, in order to perform an unpooling operation.

In particular, given a one-hot vector (being an output of a binary Argmax/Argmin) and an input value (e.g. a pooled maximum/minimum value), an unpooling operation can be performed to map the input value to an original position in a tensor, where the original position in a tensor represents the position from which the pooled maximum/minimum was obtained during the original pooling process (that produced the one-hot vector).

Figure 8:
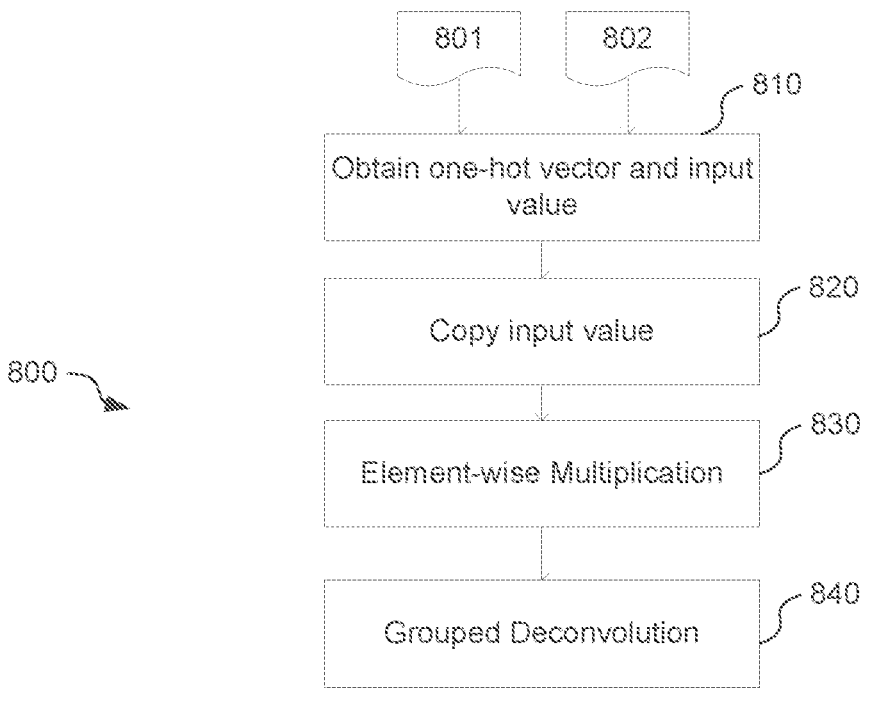
FIG. 8 illustrates an approach for performing an unpooling or backward pooling function.

FIG. 8 illustrates a method 800 of performing an unpooling or backward pooling function. This function is configured/cast to form a sequence of operations that can be carried out using the available functionality and operations provided by the fixed-function circuitry of the NNA.

The method 800 comprises a step 810 of obtaining a one-hot vector 801 and an input value 802. The one-hot vector may be one produced using the binary argmax/argmin function previously described.

The method 800 performs a step 820 of repeating a copy of the input value for each entry in the one-hot vector. The method may then perform an element-wise multiplication step 803, where each entry in the one-hot vector is multiplied by the respective copy of the input value. This can be performed using an element-wise multiplication process, which can be natively performed using the hardware accelerator 80 of FIG. 1. The output of step 803 is a product one-hot vector.

In some simplistic examples, e.g. if there is only a single input value being processed at any given time and if appropriate, steps 820 and 830 could be combined into a single step of multiplying each entry in the one-hot vector with the input value, e.g. using an element-wise multiplication process.

The method 800 then performs a step 840 of performing a (grouped) deconvolution process using the product one-hot vector and a constant binary filter. The constant binary filter is configured to correctly reroute (and sum/select) the input value to the correct location in the output tensor. As previously explained, the "correct location" is a location at which a maximum/minimum value was located in the original tensor used to produce the one-hot vector.

The step 840 could be performed using a deconvolution process of the convolution engines 140 (cf. FIG. 1). An example of a suitable deconvolution process is described in US Patent Application having publication number US 2020/0301994 A1. A more complete example of this process is later described.

Of course, it will be appreciated that the above description describes a pooling and unpooling process applied to a single tensor (where all entries in the tensor are pooled together). An overall pooling/unpooling process may be applied to multiple tensors, e.g. where each tensor represents part of a larger tensor, such as in a pooling operation performed on an input (or feature map) of a neural network. Thus, method 800 may be performed multiple times for a plurality of (sub-) tensors.

Figure 10:
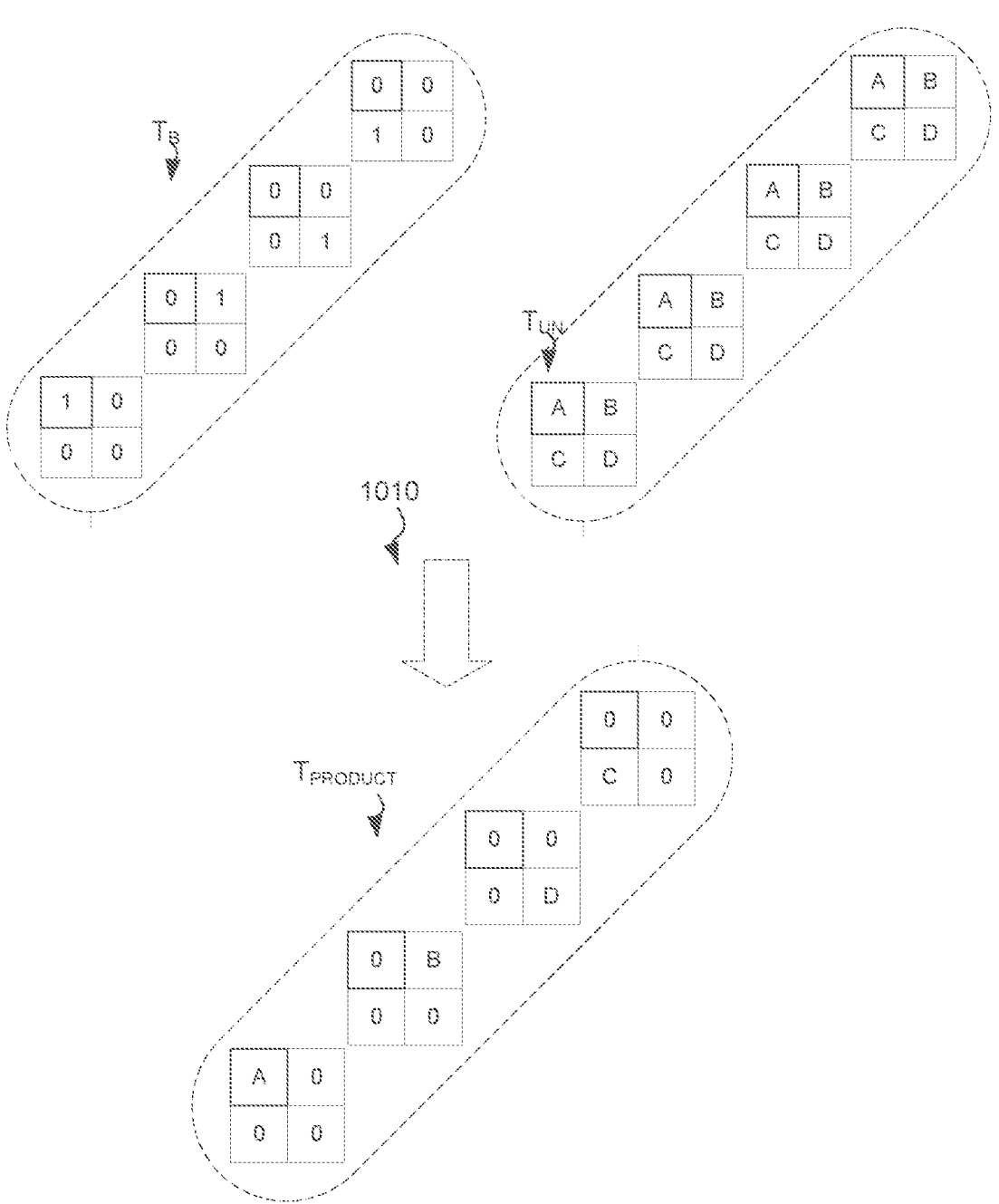
FIGS. 10 to 11 illustrates a working example of an unpooling or backward pooling function.
Figure 11:
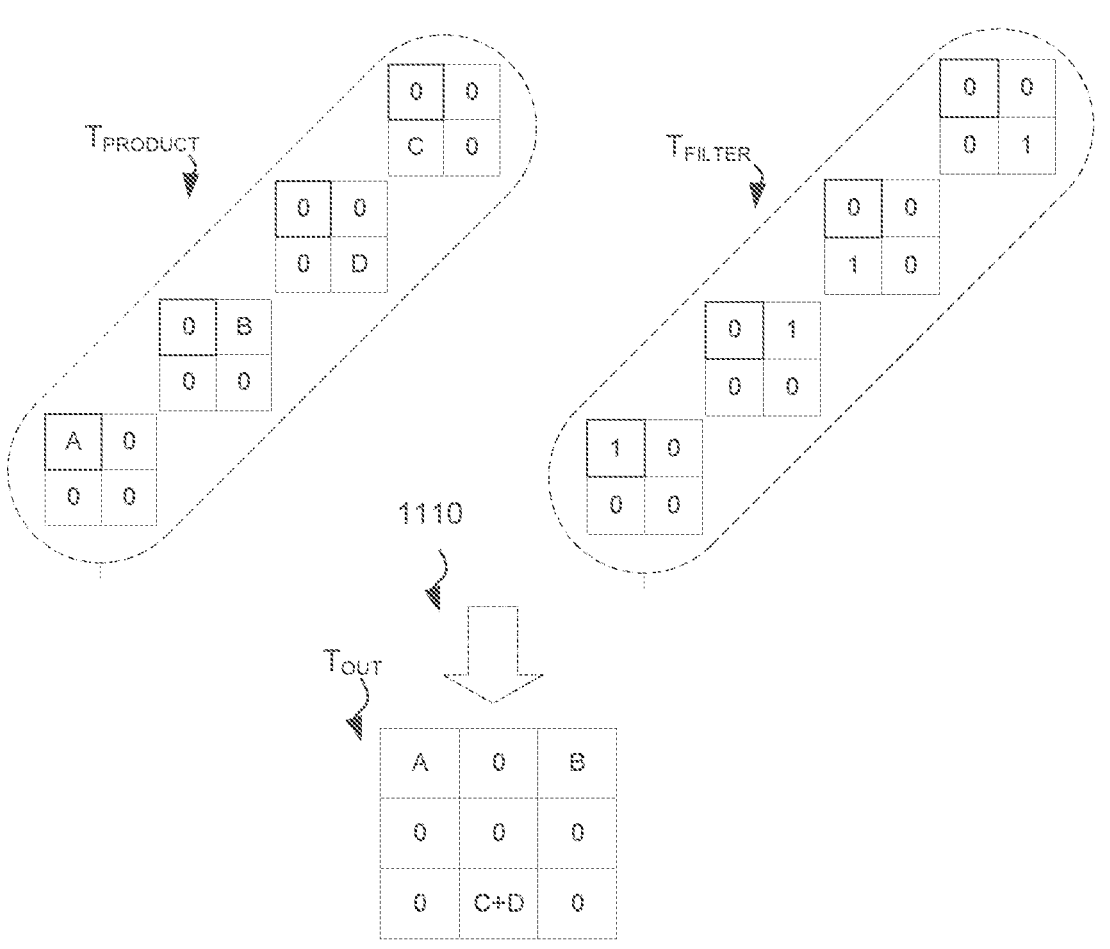

A working example of the full pooling and unpooling process proposed by the present invention is described with reference to FIGS. 9 to 11. In particular, FIG. 9 illustrates a proposed (max) pooling process and FIGS. 10 to 11 illustrate a proposed unpooling or backwards pooling process.

Figure 9:
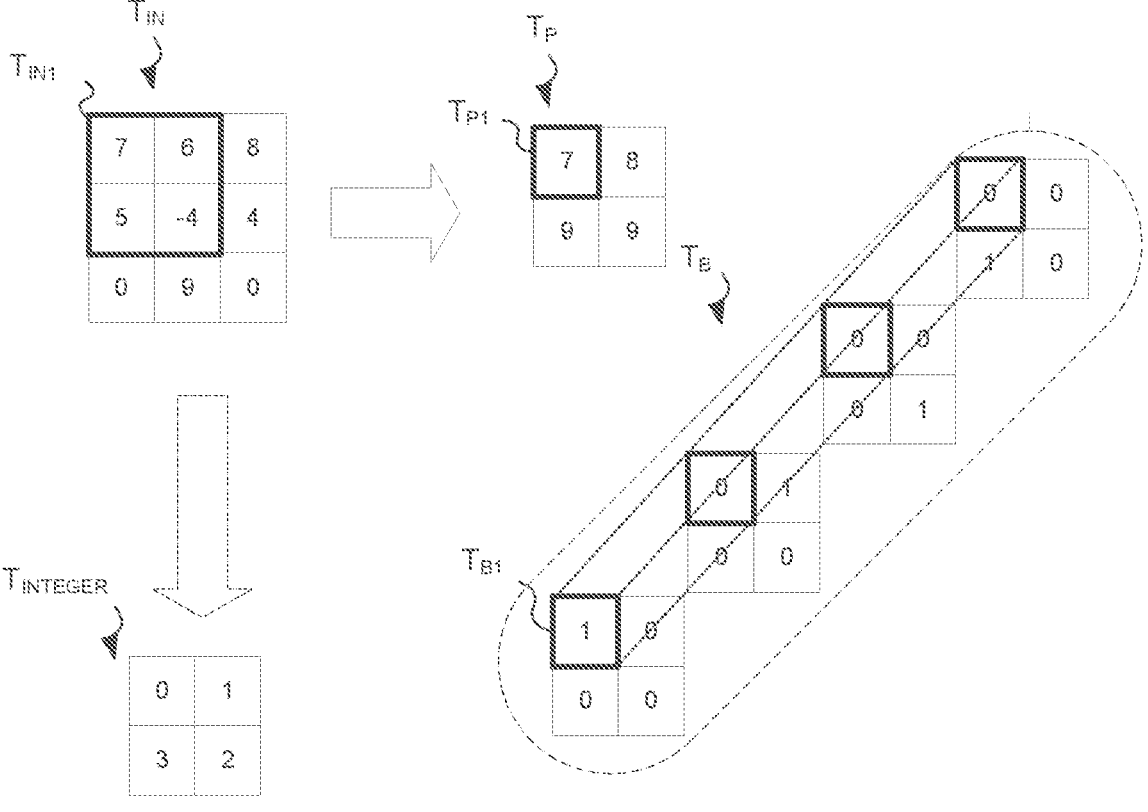
FIG. 9 illustrates a working example of a binary argmax function.

FIG. 9 illustrates a (input) tensor $T_{IN}$ having sample values. The tensor $T_{IN}$ is a fairly simplistic example of a two-dimensional tensor, although the skilled person will appreciate that the approach could be extended to any tensors having any number of dimensions (e.g. three or more dimensions).

The tensor $T_{IN}$ undergoes a max pooling process, according to an embodiment, using a filter/kernel of a size 2×2 with a stride of 1. This produces a pooled value tensor $T_P$, where each entry in the pooled value tensor represents a maximum value contained in a particular part (i.e. a corresponding receptive field) of the tensor $T_{IN}$. The receptive field of the tensor $T_{IN}$ corresponding to an entry of the pooled value tensor depends upon a location of the filter during the max pooling process, according to well-known principles.

The max pooling process also produces a binary argmax tensor $T_B$ that provides, for each entry in the pooled value tensor $T_P$ (and therefore each identified maximum value), a corresponding one-hot vector indicating the relative position of the maximum value with respect to the corresponding receptive field in the original tensor $T_{IN}$. The binary argmax tensor $T_B$ may be produced, for example, using the process described with reference to FIG. 7. In particular, for each position of the filter/kernel, the elements in the receptive field are mapped to form elements lying in a channel dimension, e.g. using a space-to-depth operation. A binary argmax function is then applied to each sub-tensor defined in each channel dimension, to output the binary argmax tensor $T_B$.

For the sake of improved clarity and contextual understanding, an integer argmax tensor $T_{INTEGER}$ has also been illustrated, that indicates an integer identifying the relative location of each maximum value in the corresponding receptive field of the tensor $T_{IN}$. The integer argmax tensor is effectively an example of the output of a (non-binary) argmax process applied to the tensor $T_{IN}$. This integer argmax tensor does not need to be produced when performing a method according to a proposed embodiment.

As an example, the entry $T_{P1}$ in the pooled value tensor $T_P$ having value "7" is equal to a maximum value contained in a first part $T_{IN1}$ or receptive field of the tensor $T_{IN}$. An argmax output for this receptive field $T_{IN1}$ would have an integer index of 0 (to identify the relative location in the receptive field $T_{IN1}$) and a binary argmax output would be one-hot vector $T_{B1}$ of [1, 0, 0, 0].

The binary argmax tensor $T_B$ thereby introduces an extra dimension compared to the integer argmax tensor $T_{INTEGER}$. A vector taken along this extra dimension is a one-hot vector for a particular entry in the pooled value tensor $T_P$.

FIGS. 10 and 11 illustrates a proposed unpooling approach, which makes use of a binary argmax tensor $T_B$, e.g. produced using the previously described approach, and an unpooling tensor $T_{UN}$ to be unpooled to the locations indicated by the binary argmax tensor. The binary argmax tensor $T_B$ has an additional dimension (e.g. a channel dimension) compared to the unpooling tensor.

The unpooling tensor $T_{UN}$ is a tensor of a same size as the tensor output by the max pooling operation. For instance, the unpooling tensor may be an output of a max pooling operation (e.g. in the pooled value tensor $T_P$ previously described) or any other suitable form of tensor, e.g. an input gradient tensor for use in the training of a neural network. The unpooling tensor $T_{UN}$ has the same dimensions as the pooled value tensor $T_P$ that was generated when producing the binary argmax tensor.

Conceptually, the binary argmax tensor is formed of a plurality of sub-tensors, each sub-tensor having the same dimensions as the unpooling tensor.

The unpooling tensor $T_{UN}$ is repeated along the additional (channel) dimension of the binary argmax tensor, i.e. so that each sub-tensor of the binary argmax tensor is associated with a corresponding copy of the unpooling tensor $T_{UN}$. This is illustrated in FIG. 10. An element-wise multiplication operation 1010, i.e. a Hadamard product operation, is then performed between each sub-tensor of the binary argmax tensor and its corresponding copy of the unpooling tensor, to produce a product tensor $T_{PRODUCT}$.

Turning to FIG. 11, this product tensor $T_{PRODUCT}$ then undergoes a grouped deconvolution process 1110, sometimes called a transposed convolution process, with a binary constant filter $T_{FILTER}$. The binary constant filter is configured so that values are rerouted to the corresponding initial locations in the receptive field of the original tensor $T_{IN}$.

In this context, a binary constant filter is a filter having a same size as the receptive field for the deconvolution, but with an additional dimension (the size of the additional dimension being equal to the number of entries in the receptive field). The binary constant filter can be conceptually modelled as a plurality of binary constant tensors—the number of binary constant tensors being equal to the number of entries in a receptive field (i.e. the filter size). Each binary constant tensor is filled with zeros, apart from a single 1 at a particular entry of the binary constant tensor. The position of this particular entry is different for each binary constant tensor, beginning at the first entry for the first binary constant tensor and progressing to the last entry for the last binary constant tensor.

A grouped deconvolution of the product tensor $T_{PRODUCT}$ with such a binary constant filter would reroute and sum/select the values to the corresponding initial locations in the receptive field of the original tensor $T_{IN}$ that generated the binary argmax tensor. This facilitates efficient performance of an unpooling or reverse pooling process through use of a (grouped) deconvolution process, which can be performed natively on the hardware accelerator.

This operation may be performed using the convolution engine 140 (cf. FIG. 1). The binary constant filter is designed such that the values of the unpooling tensor are routed/summed to the right locations indicated by the binary argmax tensor. The characteristics of the grouped deconvolution process match those of the original pooling procedure (e.g. equivalent strides and so on).

A suitable approach for performing a deconvolution for use in the present disclosure is proposed by US Patent Application having publication number US 2020/0301994 A1.

This produces a unpooled tensor $T_{OUT}$, the same size as the original tensor $T_{IN}$, with the values of the unpooling tensor positioned in the same locations as the original values that contributed to the pooled tensor $T_P$ (as indicated by the binary argmax tensor).

In the grouped deconvolution process, if more than one value in the unpooling tensor $T_{UN}$ is routed to a same location in the unpooled tensor $T_{OUT}$, then these values can be either summed as illustrated in FIG. 11 (e.g. if the unpooling tensor is a gradient input tensor) or a single one of them selected (e.g. if the unpooled tensor represents a max/min tensor, as both values should then be identical). If no value is routed to a particular location, then the value at that location is 0.

The above description has been provided assuming that a maximum pooling operation has taken place. The description may be modified for minimum pooling, replacing the term "maximum" with "minimum" where appropriate and the term "max" with "min" where appropriate.

For improved contextual understanding, a more complete description of an exemplary hardware accelerator will now be provided, by referring back to FIG. 1, which illustrates an exemplary hardware accelerator 100 that is configured to evaluate a plurality of elementary neural network operations according to examples of the present disclosure.

The hardware accelerator 100 comprises digital logic circuitry that is configured to receive data (including weights and input tensors) and commands for processing them. The hardware accelerator 100 comprises a memory interface 110, an input buffer controller 115, a command decoder 120, a coefficient buffer controller 125, a coefficient buffer 130, n input buffers 135, n convolution engines 140, n accumulators 145, an accumulation buffer 150, an activation unit 155, a local response normalize (LRN) unit 165, a shared buffer 170, a pooling unit 175, and an element-wise operations unit 185. The hardware accelerator 100 can be used to evaluate elementary neural network operations in order to implement any previously described function, as previously explained.

The memory interface 110 is configured to provide an interface between the hardware accelerator 100 and external memory 25. The external memory 25 may be considered as a separate module to the hardware accelerator 100. The command or configuration information may, for example, comprise information regarding weight and data size and format as well as their location in the external memory.

The memory interface 110 is configured to receive, from external memory 25, weights and data to be used in calculations within the neural network, as well as command information to control the operation of the hardware accelerator 100. The received weights (also referred to herein as coefficients) are passed to the coefficient buffer controller 125 and the received data is passed to the input buffer controller 115. The received commands are passed to the command decoder 120, which, in turn, is configured to decode the commands and subsequently issue control information to elements of the hardware accelerator, including the coefficient buffer controller 125 and input buffer controller 115 to control the manner in which the weight and input data is stored in the buffers.

The weights and input data received from external memory via memory interface 110 during a read of the external memory may form the weights and input data for only a portion of a single layer, all of the weights and input data to be used in processing a single layer, or may comprise the weights and input data for processing multiple layers. For example, the weights received from external memory may form the weights of a single layer and the input data received may form only a portion of the input data for a single layer (or vice versa). Any combination of data and weights across one or more layers may be received from external memory 25 in a single read from the memory (for example using a burst read).

In practice, the number of weights and data received in a single read from external memory 25 will depend upon the size of the coefficient buffer 130 and the input buffer 135. The weights are passed from the coefficient buffer controller 125 to the coefficient buffer 130 and the data received is passed from the input buffer controller 115 to a plurality of input buffers 135a-135n. The number of input buffers will depend upon the specific implementation of the accelerator 100 but may take any value. The input data is shared across all of the input buffers 135a-135n. The input buffers each form an effective bank such that the number of input buffers can be increased or decreased depending on the application.

The input buffers 135a-135n are connected to each of a plurality of multiplexers since each convolution engine 140a-140n requires access to all of the effective 'banks' of the input data. The multiplexers are each configured to select an output from one of the input buffers 135 and to pass the values output from the selected input buffer 135 to a respective convolution engine 140a-140n. In addition, weights from the coefficient buffer 130 are provided as a second input into each convolution engine 140a-140n. The convolution engines 140 are configured to perform a convolution calculation on the received input data using the weights received from the coefficient buffer 130. The resultant output of each convolution engine 140a-140n is provided as an input to a respective accumulator of a plurality of accumulators 145a-145n.

Each accumulator 145a-145n is connected to an accumulation buffer 150. The accumulation buffer 150 is configured to store accumulated results received from each accumulator 145a-145n. The accumulation buffer 150 is connected to the memory interface 110. As such, the accumulation buffer 150 is configured to send and receive data to and from external memory 25 via memory interface 110. Specifically, the accumulation buffer 150 is configured to be able to store and restore its values from the external memory 25 via memory interface 110, as will be described in more detail below. The accumulation buffer 150 is connected to the input of the accumulators 145a-145n and is configured to feed values back into the accumulators 145a-145n to enable accumulation calculations to take place.

The accumulation buffer 150 is configured to pass accumulated values to the activation unit 155 and/or the element-wise operations unit 185. The activation unit 155 is configured to perform at least one of a number of different activation functions. The activation unit 155 incorporates a lookup table (LUT), for storing an activation function, such as a sigmoid activation, to be applied to data input to the activation unit. The activation unit 155 is also operable to add/subtract a bias value to/from a tensor. This can be used to add a constant to the tensor or subtract a constant from the tensor.

The resultant value calculated by the activation unit 155 can be passed to be processed by the LRN unit 165 and/or the pooling unit 175 via the shared buffer 170. The LRN unit 165 is configured to perform a local response normalisation.

This may be performed within a single plane of input data. Alternatively or in addition, the LRN operation may also be performed across planes.

A result stored in the shared buffer 170 is passed to the memory interface 110, which can either store the result in external memory 25 or pass the result back into the input buffers for further processing without having to first be passed out to external memory.

The shared buffer 170 is configured to buffer values from any one or more of the activation unit 155, the LRN unit 165, the pooling unit 175, and the element-wise operations unit 185 until all the values required to perform the next operation are available. In this way, the shared buffer 170 is used for efficiency of storage as it can hold values required in later operations without having to use external memory 25.

The element-wise operations unit 185 comprises circuitry configured to perform element-wise operations on tensors received from the accumulation buffer 150 and/or activation unit 155. The supported element-wise operations may include element-wise addition, subtraction, multiplication, division, and maximum (or minimum) of the respective elements of the tensors.

Element-wise operations are operations that are repeated for multiple elements of at least one tensor. The operations are typically repeated for all elements of the tensor. Two categories of element-wise operation may be considered: unary operations, having a single operand, and binary operations, having two operands. The element-wise operations unit 185 handles binary element-wise operations. Element-wise operations may also be performed by other components of the hardware accelerator. For example, the activation unit 155 may perform unary element-wise operations, by loading a desired function into the LUT and applying the function to every element of a tensor.

Whilst the hardware accelerator of FIG. 1 illustrates a particular order in which the units are arranged and thus how the processing of data flows through the hardware implementation, it will be appreciated that the specific calculations required and the order in which data is processed across layers may vary.

In some examples, the functions performed by the activation 155, LRN 165, pooling 175, and element-wise 185 units may all be performed. In other examples, only some of these functions may be performed and not necessarily in the order set out in the hardware accelerator 100. To achieve a configurable order of processing these functions, each of the activation 155, LRN 165, pooling 175 and element-wise 185 units may be configured to receive control signalling configuring the unit into a bypass mode in which the function is not performed and the input values are simply passed through the unit without change.

In some examples, the data of a particular layer may need to be processed first by the convolution engines 140a-n and then second according to the activation, LRN, pooling, and element-wise units 155, 165, 175, 185. In these examples, the outputs from the convolution engines 140a-n are passed via the accumulators 145a-n to the accumulation buffer 150 and are then passed to activation, LRN, pooling, and element-wise units 155, 165, 175, 185 for further processing. In other examples, the data may need to be processed differently. For example, data may need to be processed first according to the activation, LRN, pooling, and element-wise units 155, 165, 175, 185 and second according to the convolution engines 140a-n.

In these arrangements, data can be passed directly to the activation unit 155 via the accumulation buffer 150, where the accumulation buffer 150 has received the input data directly from the memory interface 110 which has received the data from external memory. In this way, the processing performed by convolution engines 140a-n and accumulator 145a-n is effectively skipped and the data can be passed directly to the activation 155, LRN 165, pooling 175, and element-wise 185 units. Then, once processing using activation, LRN, pooling, and element-wise units 155, 165, 175, 185 is completed, the resultant values can be passed into the input buffer controller 115 via the memory interface 110. In some arrangements, the resultant values can be first passed to external memory 25 via memory interface 110 and then retrieved from external memory 25 before use.

In other arrangements, the memory interface 110 may pass the resultant values to the input buffer controller 115 without passing the values to external memory 25. By avoiding the need to pass the values resulting from calculations using the activation, LRN, pooling, and element-wise unit 155, 165, 175, 185 to external memory 25, memory bandwidth is reduced and therefore the latency in processing the data is also reduced.

Advantageously, since the activation, LRN, pooling, and element-wise units 155, 165, 175, 185 are placed linearly, it is possible to perform these operations back-to-back without having to retrieve data from external memory 25. In some implementations, the order in which the activation, LRN, pooling, and element-wise units 155, 165, 175, 185 are connected may vary. For example, the activation, LRN, and pooling units 155, 165, 175 may be connected in reverse order such that the pooling unit is connected to the accumulation buffer 150 and the activation unit is connected to the memory interface 110.

Figure 12:
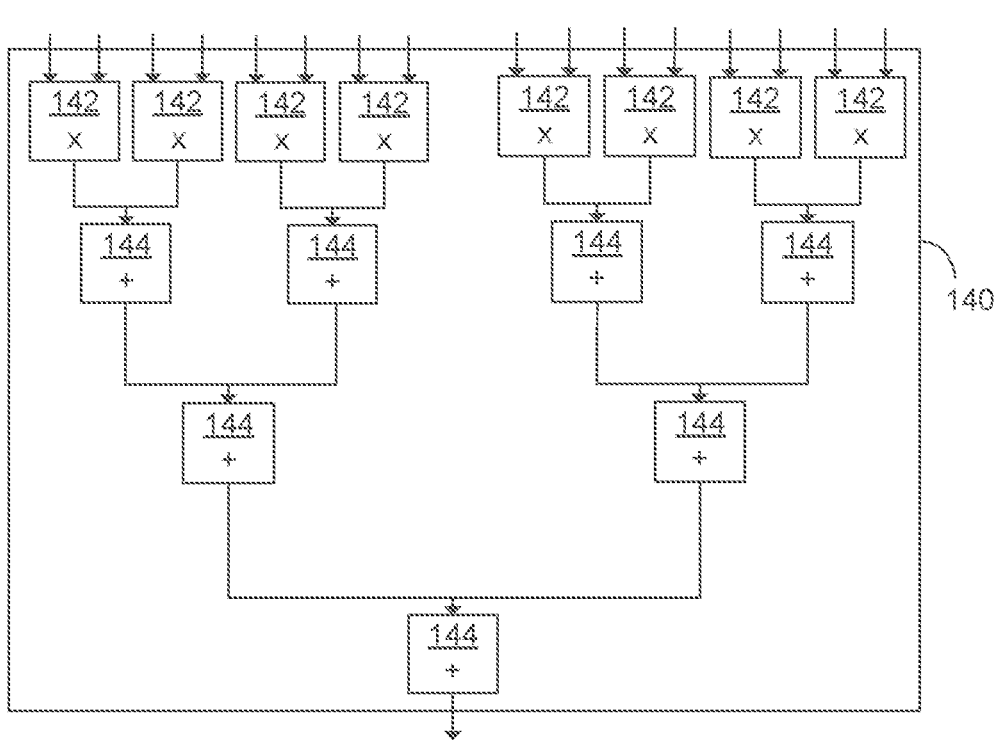
FIG. 12 is a block diagram of a convolution engine as used in FIG. 1.

FIG. 12 illustrates the structure of each of the convolution engines 140 in FIG. 1. The convolution engine 140 comprises a plurality of elements of multiply logic 142, each configured to multiply a weight by an input data element, and a plurality of elements of addition logic 144, configured in a tree structure to sum the outputs of the elements of multiply logic 142.

Figure 13:
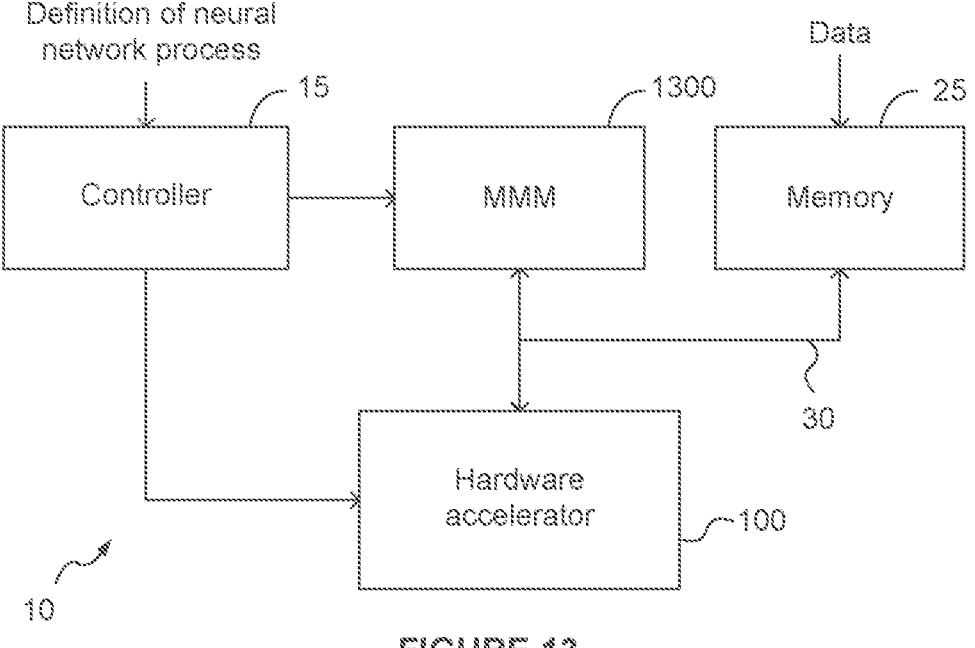
FIG. 13 is a block diagram of a data processing system according to an example.

FIG. 13 is a block diagram of a data processing system 10 for implementing any herein described function in a hardware accelerator 100 (NNA), according to an example. The function may, for instance, be an argmax/argmin function, a binary argmax/argmin function, a pooling function, an unpooling function and/or a backward pooling function. The data processing system comprises the hardware accelerator 100; a controller 15; a memory 25; and a memory manipulation module (MMM) 1300. At least the hardware accelerator 100, the memory 25, and the MMM 1300 are connected by a data bus 30.

The controller 15 is configured to receive a definition of at least neural network layer having such a function and map the layer to a plurality of elementary neural network operations that can be performed natively by the hardware accelerator 100. The controller 15 is further configured to control the hardware accelerator 100 (e.g. which may include the MMM 1300) to evaluate the layer having the argmax or argmin function by means of these elementary operations. Thus, the controller 15 controls the evaluation of the plurality of elementary neural network operations that are executed by the hardware accelerator 100 to thereby evaluate the layer having the argmax or argmin function.

The hardware accelerator 100 is configured to evaluate the plurality of elementary neural network operations.

The MMM 1300 is configured to manipulate multidimensional data in memory in various ways, including transpose or permute operations that interchange different dimensions of the data. In some examples, the MMM 1300 may be configured to transform data by embedding the channel dimension of the data in one or both of the width or height dimensions, or exchanging the channel dimension with one or both of these spatial dimensions. In alternative examples, the MMM may transpose or permute any other combination of the dimensions of the input data, including the batch dimension.

The MMM may, for instance, be used during a (first/second) maximum/minimum operation, for instance, to reformat a tensor into a form and/or dimension suitable for processing by a pooling unit (i.e. to carry out max/min pooling).

The MMM may, for instance, be formed as an aspect of the hardware accelerator 100, and is only here shown separately to demonstrate one possible embodiment.

Figure 14:
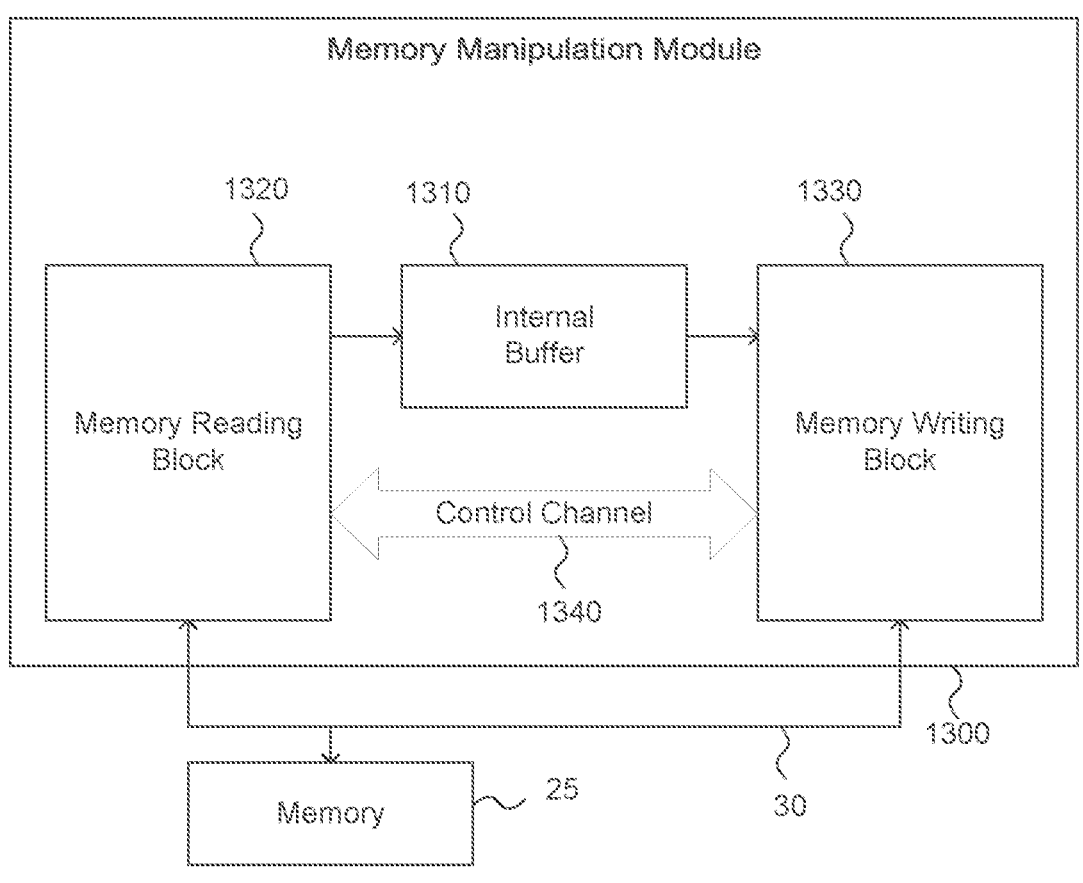
FIG. 14 is a block diagram of the memory manipulation module in FIG. 13.

FIG. 14 is a block diagram of the MMM 1300 used in FIG. 13. As mentioned already, the MMM 1300 is coupled to the memory 25, via the bus 30. The MMM 1300 comprises a memory reading block 1320; an internal buffer 1310; and a memory writing block 1330. A control channel 1340 is used to coordinate the operations performed by the memory reading block 1320 and the memory writing block 1330. Both the memory reading block 1320 and the memory writing block 1330 are coupled to the bus 30. An output of the memory reading block 1320 is coupled to an input of the internal buffer 1310. An input of the memory writing block 1330 is coupled to an output of the internal buffer 1310.

The memory reading block 1320 reads data from the memory 25. The memory reading block 1320 writes the data (that was read from the memory 15) to the internal buffer 1310. The memory writing block 1330 reads data from the internal buffer 1310 and writes the data (that was read from the internal buffer 1310) back to the external memory 25. By the combination of operations performed by the memory reading block 1320 and the memory writing block 1330, the data may be transformed in the ways previously described. The transformation may occur when moving the data from the memory 25 to the internal buffer 1310, or it may occur when moving the data from the internal buffer 1310 to the memory 25. In some cases, the transformation may occur in part between the memory 25 and the internal buffer 1310, and in part between the internal buffer 1310 and the memory 25.

Because the memory reading block 1320 and the memory writing block 1330 are provided as separate hardware blocks, they are able to operate in parallel. That is, the memory reading block 1320 can perform steps 310 and 320 while the memory writing block 130 is performing steps 330 and 340 (the steps are explained in detail below with reference to FIGS. 1A and 1B). The control channel 140 provides for communication between the memory reading block 1300 and the memory writing block 130, to maintain synchronisation between the two blocks.

The present disclosure thereby proposes a data processing system in which embodiments can be implemented. In the illustrated examples, such as in FIG. 13, the data processing system 10 was constructed around the hardware accelerator 100—which, in those examples, was an NNA. However, the data processing system may instead be implemented partially or entirely within an NNA. For example, the hardware accelerator 100, the MMM 1300, and the controller 15 may represent sub-components within an NNA.

Figure 15:
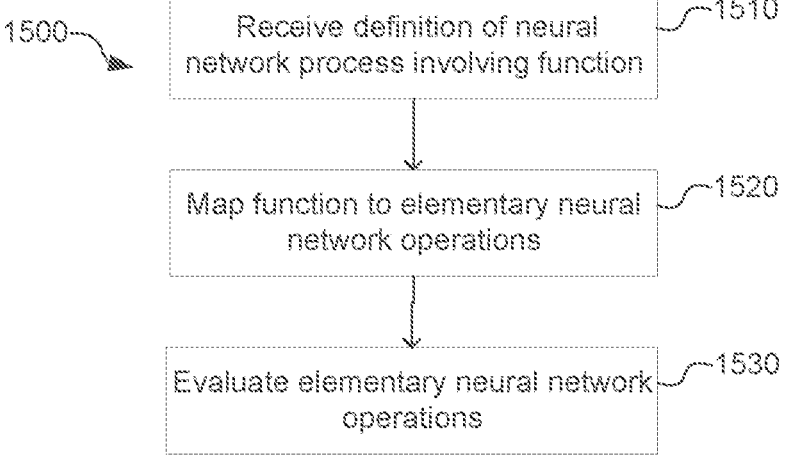
FIG. 15 illustrates a method according to an embodiment.

FIG. 15 is a flowchart 1500 illustrating a method performed by the data processing system 10 according to an example of the present disclosure. In this example, the data processing system 10 implements a function. The function may, for instance, be an argmax/argmin function, a binary argmax/argmin function, a pooling function, an unpooling function and/or a backward pooling function.

In step 1510, the controller 15 receives as an input a definition of a neural network process involving the function. The neural network process is to be performed on some data to be processed. In step 1520, the controller maps the function and/or neural network process to a set of elementary neural network operations, e.g. by mapping the function and/or neural network process to an equivalent computational graph comprising a plurality of elementary neural network operations. In step 1530, the hardware accelerator 100 processes the neural network process by evaluating the plurality of elementary neural network operations, to produce the result of the neural network process.

The data to be processed comprises media data, i.e. image data and/or audio data.

In the present example, the mapping to the plurality of elementary operations is based on a recasting of the function to elementary components, embodiments of which have been previously described.

Figure 16:
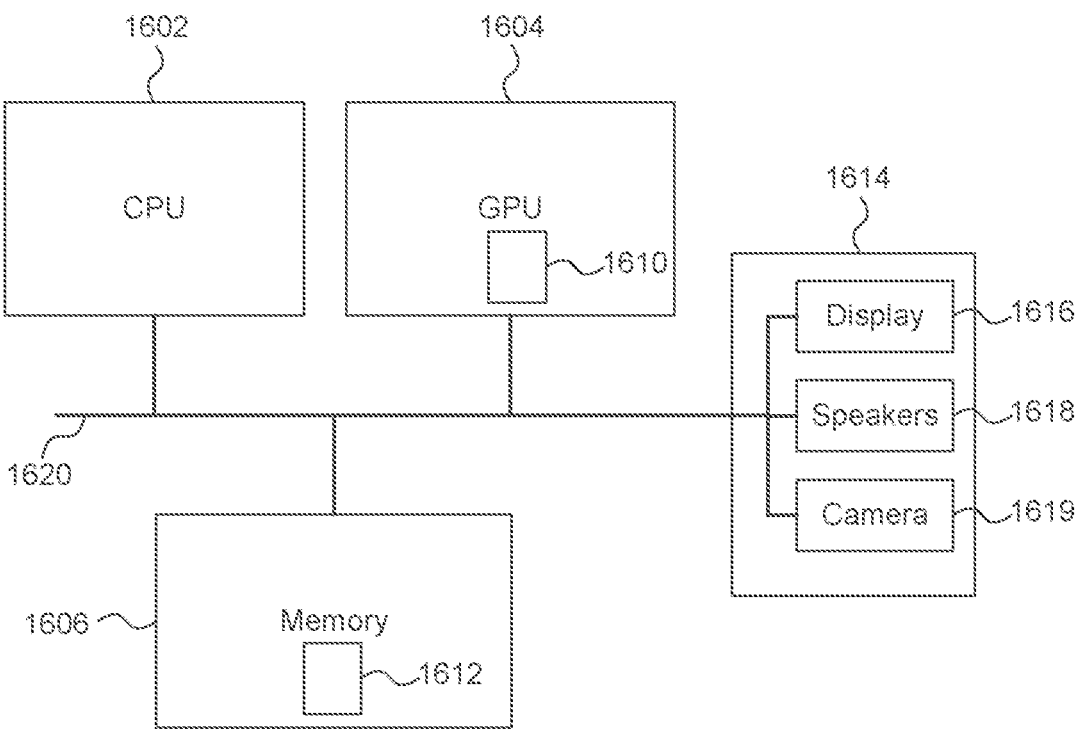
FIG. 16 shows a computer system in which a data processing system is implemented.

FIG. 16 shows a computer system in which the data processing systems described herein may be implemented. The computer system comprises a CPU 1602, a GPU 1604, a memory 1606 and other devices 1614, such as a display 1616, speakers 1618 and a camera 1619. A processing block 1610 is implemented on the GPU 1604. In other examples, the processing block 1610 may be implemented on the CPU 1602. The components of the computer system can communicate with each other via a communications bus 1620. A store 1612 is implemented as part of the memory 1606.

While FIG. 16 illustrates one implementation of a data processing system, it will be understood that a similar block diagram could be drawn for an artificial intelligence accelerator system—for example, by replacing either the CPU 1602 or the GPU 1604 with a Neural Network Accelerator (NNA), or by adding the NNA as an additional unit. In such cases, the processing block 1610 can be implemented in the NNA.

Any data processing system illustrated in FIGS. 1-16 are shown as comprising a number of functional blocks. This is schematic only and is not intended to define a strict division between different logic elements of such entities. Each functional block may be provided in any suitable manner. It is to be understood that intermediate values described herein as being formed by a data processing system need not be physically generated by the data processing system at any point and may merely represent logical values which conveniently describe the processing performed by the data processing system between its input and output.

The data processing systems described herein may be embodied in hardware on an integrated circuit. The data processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a randomaccess memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java® or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a data processing system configured to perform any of the methods described herein, or to manufacture a data processing system comprising any apparatus described herein. An integrated circuit definition dataset may be, for example, an integrated circuit description.

Therefore, there may be provided a method of manufacturing, at an integrated circuit manufacturing system, a data processing system as described herein. Furthermore, there may be provided an integrated circuit definition dataset that, when processed in an integrated circuit manufacturing system, causes the method of manufacturing a data processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing system will now be described with respect to FIG. 17.

Figure 17:
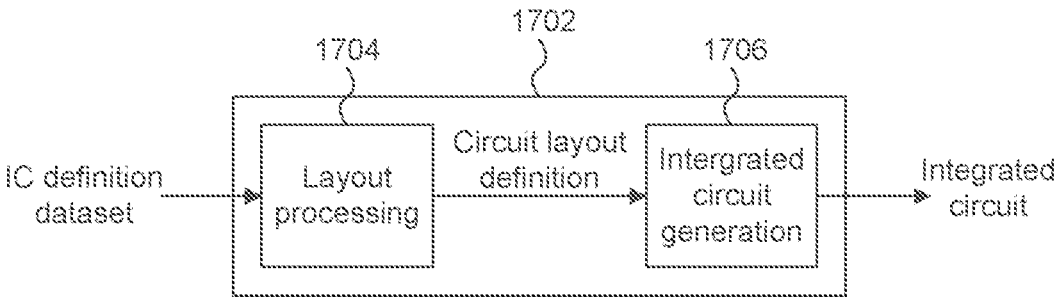
FIG. 17 shows an integrated circuit manufacturing system for generating an integrated circuit embodying a data processing system.

FIG. 17 shows an example of an integrated circuit (IC) manufacturing system 1702 which is configured to manufacture a data processing system as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining a data processing system as described in any of the examples herein), process the IC definition dataset, and generate an IC according to the IC definition dataset (e.g. which embodies a data processing system as described in any of the examples herein). The processing of the IC definition dataset configures the IC manufacturing system 1702 to manufacture an integrated circuit embodying a data processing system as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a data processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 16 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 16, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

In the present application, ordinal numbers are used as labels to distinguish different features/elements from one another. Where appropriate, the ordinal numbers may be replaced by other labels or removed entirely (e.g. a "first element" may simply be an "element" if there is only a single one of these elements present). The skilled person would be readily capable of reformatting claims and other text appropriately.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing data according to a neural network process using a hardware accelerator comprising fixed-function circuitry configured to perform a set of available elementary neural network operations, the method comprising:

receiving a definition of a neural network process to be performed on the data, the neural network process comprising a neural network with an associated argmax or argmin function;

mapping the argmax or argmin function to a set of elementary neural network operations, wherein the set of elementary neural network operations comprises only elementary neural network operations from the set of available elementary neural network operations; and processing the data according to the neural network process, using the fixed-function circuitry of the hardware accelerator to perform the neural network with the associated argmax or argmin function, wherein the argmax or argmin function is performed using the set of elementary neural network operations;

wherein the data comprises image data and/or audio data; and wherein each of the set of elementary neural network operations is selected from a list consisting of:

an element-wise subtraction operation, an element-wise addition operation, an element-wise multiplication operation, an element-wise maximum operation, an element-wise minimum operation, a max pooling operation or min pooling operation, a magnitude operation, and one or more lookups operations using one or more lookup tables;

wherein the set of elementary neural network operations implements:

a binary maximum/minimum operation, applied to an input tensor, to produce a binary tensor of the same spatial size as the input tensor, wherein each element in the binary tensor:

corresponds to a different element of the input tensor; and contains a binary value indicating whether or not the corresponding element of the input tensor has a value equal to the maximum/minimum value contained in the input tensor:

an integer index operation, applied to the binary tensor, that identifies one or more indexes of the binary tensor, the identified one or more indexes being indexes of the one or more elements of the binary tensor that have a binary value that indicates the corresponding element of the input tensor has a value equal to the maximum/minimum value contained in the input tensor; and a tie elimination operation, applied to the identified indexes, that selects a single one of the one or more identified indexes to provide the output of the argmax or argmin function, wherein the binary maximum operation is performed if the argmax or argmin function is the argmax function, and binary minimum operation is performed if the argmax or argmin function is the argmin function, wherein the binary maximum/minimum operation comprises performing:

a first maximum/minimum operation, applied to the input tensor, that identifies the maximum/minimum value contained in any element of the input tensor; and an equals operation, applied to each element of the input tensor, that given the output of the maximum/minimum operation, modifies the value of the element to be either a first binary value or a second, different binary value responsive to whether or not the value of the element contains the maximum/minimum value contained in the input tensor, to thereby produce the binary tensor, wherein the first maximum/minimum operation is the first maximum operation if the argmax or argmin function is the argmax function, and the first maximum/minimum operation is the first minimum operation if the argmax or argmin function is the argmin function, wherein the first maximum/minimum operation is performed by a first maximum/minimum iterative process comprising:

splitting a first comparative tensor into two parts;

processing the two parts of the first comparative tensor using, for the first maximum operation an element-wise maximum operation and for the first minimum operation an element-wise minimum operation, to produce a new first comparative tensor;

wherein:

for a first iteration of the maximum/minimum iterative process, the input tensor acts as the first comparative tensor;

for any subsequent iterations of the maximum/minimum iterative process, the new first comparative tensor acts as the first comparative tensor; and the maximum/minimum iterative process is repeated until the first comparative tensor contains only a single element, this single element having for the first maximum operation, the maximum value contained in the input tensor or for the first minimum operation the minimum value contained in the input tensor.

2. The method of claim 1, wherein the equals operation comprises performing:

a subtraction operation, applied to the input tensor, that subtracts the maximum/minimum value contained in the input tensor from the value of each element of the input tensor to produce a difference input tensor; and a zero-identification operation, applied to the difference input tensor, that sets the value of all elements having a zero value to be equal to a first binary value and sets the value of all elements having a non-zero value to be equal to a second, different binary value, to thereby produce the binary tensor.

3. The method of claim 1, wherein the subtraction operation is performed using an element-wise subtraction operation.

4. The method of claim 1, wherein the zero identification operation is performed by using a first look-up table to set the value of all elements having a zero value to the first binary value and to set the value of all elements have a non-zero value to the second binary value.

5. The method of claim 1, wherein:

in the binary tensor:

a value of 1 indicates that the corresponding element of the input tensor has a value equal to the maximum/minimum value contained in the input tensor; and a value of 0 indicates the corresponding element of the input tensor does not have a value equal to the maximum/minimum value contained in the input tensor; and the integer index operation is performed by performing a binary tensor multiplication operation that multiplies the binary tensor by an index tensor, which has the same spatial size as the binary tensor, wherein each entry of the index tensor indicates an index value for each entry in the binary tensor, to thereby produce a maximum index tensor.

6. The method of claim 5, wherein the binary tensor multiplication operation is performed using an element-wise multiplication operation.

7. The method of claim 5, wherein the tie elimination operation is performed by performing a second maximum/minimum operation on the maximum index tensor.

8. The method of claim 7, wherein the second maximum/minimum operation is implemented using, for an argmax function, a max pooling operation and, for the argmin function, a min pooling operation.

9. The method of claim 7, wherein the second maximum/minimum operation is performed by performing one or more element-wise maximum/minimum operations between different parts of the maximum index tensor.

10. The method of claim 9, wherein the second maximum/minimum operation is performed by a second maximum/minimum iterative process comprising:

splitting a second comparative tensor into two parts;

processing the two parts of the second comparative tensor using, for the argmax function an element-wise maximum operation and for the argmin function an element-wise minimum operation, to produce a new second comparative tensor;

wherein:

for a first iteration of the maximum/minimum iterative process, the maximum index tensor acts as the second comparative tensor;

for any subsequent iterations of the maximum/minimum iterative process, the new second comparative tensor acts as the second comparative tensor; and the maximum/minimum iterative process is repeated until the second comparative tensor contains only a single element, this single element being for the first maximum operation, the maximum value contained in the input tensor or for the first minimum operation the minimum value contained in the input tensor.

11. The method of claim 5, wherein the index tensor is stored in a look-up table.

12. A non-transitory computer-readable medium or data carrier having stored thereon computer readable code configured to cause the method of claim 1 to be performed when the code is run.

13. A data processing system for processing data according to a neural network process, the data processing system comprising:

a hardware accelerator comprising fixed-function circuitry configured to perform a set of available elementary neural network operations; and a controller configured to:

receive a definition of a neural network process to be performed on the data, the neural network process comprising a neural network with an associated argmax or argmin function, map the argmax or argmin function to a set of elementary neural network operations, wherein the set of elementary neural network operations comprises only elementary neural network operations from the set of available elementary neural network operations, and process the data according to the neural network process, using the fixed-function circuitry of the hardware accelerator to perform the neural network with the associated argmax or argmin function, wherein the argmax or argmin function is performed using the set of elementary neural network operations;

wherein the data comprises image data and/or audio data; and wherein each of the set of elementary neural network operations is selected from a list consisting of:

an element-wise subtraction operation, an element-wise addition operation, an element-wise multiplication operation, an element-wise maximum operation, an element-wise minimum operation, a max pooling operation or min pooling operation, a magnitude operation, and one or more lookups operations using one or more lookup tables, wherein the set of elementary neural network operations implements:

a binary maximum/minimum operation, applied to an input tensor, to produce a binary tensor of the same spatial size as the input tensor, wherein each element in the binary tensor:

corresponds to a different element of the input tensor; and contains a binary value indicating whether or not the corresponding element of the input tensor has a value equal to the maximum/minimum value contained in the input tensor;

an integer index operation, applied to the binary tensor, that identifies one or more indexes of the binary tensor, the identified one or more indexes being indexes of the one or more elements of the binary tensor that have a binary value that indicates the corresponding element of the input tensor has a value equal to the maximum/minimum value contained in the input tensor; and a tie elimination operation, applied to the identified indexes, that selects a single one of the one or more identified indexes to provide the output of the argmax or argmin function, wherein the binary maximum operation is performed if the argmax or argmin function is the argmax function, and binary minimum operation is performed if the argmax or argmin function is the argmin function, wherein the binary maximum/minimum operation comprises performing:

a first maximum/minimum operation, applied to the input tensor, that identifies the maximum/minimum value contained in any element of the input tensor; and an equals operation, applied to each element of the input tensor, that given the output of the maximum/minimum operation, modifies the value of the element to be either a first binary value or a second, different binary value responsive to whether or not the value of the element contains the maximum/minimum value contained in the input tensor, to thereby produce the binary tensor, wherein the first maximum/minimum operation is the first maximum operation if the argmax or argmin function is the argmax function, and the first maximum/minimum operation is the first minimum operation if the argmax or argmin function is the argmin function, wherein the first maximum/minimum operation is performed by a first maximum/minimum iterative process comprising:

splitting a first comparative tensor into two parts;

processing the two parts of the first comparative tensor using, for the first maximum operation an element-wise maximum operation and for the first minimum operation an element-wise minimum operation, to produce a new first comparative tensor;

wherein:

for a first iteration of the maximum/minimum iterative process, the input tensor acts as the first comparative tensor;

for any subsequent iterations of the maximum/minimum iterative process, the new first comparative tensor acts as the first comparative tensor; and the maximum/minimum iterative process is repeated until the first comparative tensor contains only a single element, this single element having for the first maximum operation, the maximum value contained in the input tensor or for the first minimum operation the minimum value contained in the input tensor.

14. The data processing system of claim 13, wherein the hardware accelerator comprises any one of, or any combination of two or more of:

an activation unit, comprising an LUT;

a local response normalisation unit, configured to perform a local response normalisation;

an element-wise operations unit, configured to apply a selected operation to every pair of respective elements of two tensor of identical size;

one or more convolution engines, configured to perform convolution operations; and a pooling unit, configured to perform pooling operations, including max pooling and/or min pooling.

* * * * *